(12) United States Patent
Mihara et al.

(10) Patent No.: US 7,881,373 B2
(45) Date of Patent: Feb. 1, 2011

(54) VIDEO DATA COMPRESSION APPARATUS AND METHOD OF SAME

(75) Inventors: Kanji Mihara, Kanagawa (JP); Takuya Kitamura, Kanagawa (JP); Takao Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 11/223,162

(22) Filed: Sep. 8, 2005

(65) Prior Publication Data

US 2006/0045364 A1 Mar. 2, 2006

Related U.S. Application Data

(63) Continuation of application No. 10/045,576, filed on Mar. 20, 2001, now Pat. No. 7,050,495.

(51) Int. Cl.
*H04N 7/12* (2006.01)
*G06K 9/36* (2006.01)

(52) U.S. Cl. .................................. 375/240.04; 382/239

(58) Field of Classification Search ................. 348/409, 348/415, 384, 390, 400, 401, 402, 403, 404, 348/405, 406, 407, 411, 412, 413, 699, 700, 348/701, 419, 469, 410, 416, 420; 382/232, 382/233, 236, 238, 248, 249, 250, 251; 375/240, 375/241, 242, 244, 245, 240.12, 240.03, 375/240.01, 240.02, 240.05, 240.07, 240.06, 375/240.4
See application file for complete search history.

(56) References Cited

U.S. PATENT DOCUMENTS

| 5,265,180 | A | | 11/1993 | Golin | |
|---|---|---|---|---|---|
| 5,691,775 | A | | 11/1997 | Astle | |
| 5,719,986 | A | * | 2/1998 | Kato et al. | 386/109 |
| 5,774,593 | A | | 6/1998 | Zick et al. | |
| 5,835,149 | A | | 11/1998 | Astle | |
| 5,929,914 | A | | 7/1999 | Normand | |
| 5,933,532 | A | * | 8/1999 | Mihara | 382/232 |
| 5,986,712 | A | * | 11/1999 | Peterson et al. | 375/240.14 |
| 6,151,360 | A | * | 11/2000 | Kato et al. | 375/240.03 |
| 6,337,879 | B1 | * | 1/2002 | Mihara et al. | 375/240 |

FOREIGN PATENT DOCUMENTS

EP 0 526 201 2/1993

(Continued)

OTHER PUBLICATIONS

Keesman G et al.: "Bit-Rate Control for MPEG Encoders" Signal Processing. Image Communication, Elsevier Science Publishers, Amsterdam, NL, vol. 6, No. 6, Feb. 1, 1995, pp. 545-560, XP000491860 ISSN: 0923-5965.

Lee J. et al.: "Adaptive Frame Type Selection for Low Bit-Rate Video Coding" SPIE Visual Communications and Image Processing. vol. 2308 No. 2, Sep. 25, 1994, pp. 1411-1422, XP002035257.

*Primary Examiner*—Behrooz Senfi
(74) *Attorney, Agent, or Firm*—Frommer Lawrence & Haug LLP; William S. Frommer; Thomas F. Presson

(57) ABSTRACT

A video data compression apparatus with which compressed video data of suitable amounts of data can be produced and the time required for processing is short. The apparatus approximates a real difficulty data $D_j$ indicating the difficulty of the pattern of each picture by the ME residual, flatness, and intra AC and further calculates the target amount of data $T_j$ of the compressed video data from the approximated real difficulty data $D_j$. An encoder performs compression and coding so that the amount of data of the compressed video data becomes substantially the target amount of data $T_j$.

11 Claims, 16 Drawing Sheets

FOREIGN PATENT DOCUMENTS

| | | |
|---|---|---|
| EP | 0 597 647 | 5/1994 |
| EP | 0 677 969 | 10/1995 |
| EP | 0 700 214 | 3/1996 |
| EP | 0 797 359 | 9/1997 |
| JP | 7 284109 | 10/1995 |
| JP | 7 288810 | 10/1995 |
| JP | 3765129 | 2/2006 |
| WO | WO 95 29541 | 11/1995 |

* cited by examiner

VIDEO DATA COMPRESSION APPARATUS AND METHOD OF SAME

This application is a continuation of U.S. application Ser. No. 10/045,576, filed Mar. 20, 2001 now U.S. Pat. No. 7,050,495.

BACKGROUND OF THE INVENTION

1. Field of the Invention

The present invention relates to a video data compression apparatus for compressing and coding noncompressed video data and a method of same.

2. Description of the Related Art

When compressing and coding noncompressed digital video data in units of GOPs (groups of pictures) comprised of an I picture (intra-coded picture), a B picture (bi-directionally predictive coded picture), and a P picture (predictive coded picture) by a method such as the MPEG (Moving Picture Experts Group) and recording the same on a recording medium such as a magneto-optical disc (MO disc) or transmitting the same via communication line, it is necessary to control the amount of data (amount of bits) of the compressed video data after the compression and coding to be not more than the recording capacity of the recording medium or not more than the transmission capacity of the communication line while holding the quality of the image after expansion and decoding high.

For this purpose, first, there is adopted a method of preliminarily compressing and coding the noncompressed video data to estimate the amount of data after the compression and coding (first pass), then adjusting the compression rate based on the estimated amount of data and performing the compression and coding so that the amount of data after the compression and coding becomes not more than the recording capacity of the recording medium by (second pass) (hereinafter, such a compression and coding method will be also referred to as "two pass encoding").

However, if performing the compression and coding by the two pass encoding, it is necessary to apply similar compression and coding processing two times with respect to the same noncompressed video data, so a long time is taken. Further, since the final compressed video data cannot be calculated by one compression and coding processing, the shot video data cannot be compressed, coded, recorded, or transmitted in real time as it is.

SUMMARY OF THE INVENTION

An object of the present invention is to provide a video data compression apparatus with which the audio and/or video data can be compressed and coded to a predetermined amount of data or less not by the two pass encoding and a method of the same.

Further, another object of the present invention is to provide a video data compression apparatus with which the video data can be compressed and coded in almost real time and in addition with which a high quality image can be obtained after the expansion and decoding and a method of the same.

Further, still another object of the present invention is to provide a video data compression apparatus with which the compression and coding processing can be carried out by adjusting the compression rate by estimating the amount of data after the compression and coding not by the two pass encoding and a method of the same.

According to a first aspect of the present invention, there is provided a video data compression apparatus having an indicator data calculating means for calculating indicator data indicating a complexity of video data for every picture from noncompressed video data; a target value calculating means for calculating a target value of an amount of data after compression of the video data for every picture based on the calculated indicator data; and a compressing means for compressing the noncompressed video data so that the amount of data after compression becomes the calculated target value.

According to a second aspect of the present invention, there is provided a data compression method comprising the steps of calculating indicator data indicating a complexity of video data for every picture from noncompressed video data; calculating a target value of an amount of data after compression of the video data for every picture based on the calculated indicator data; and compressing the video data by a predetermined compression method so that the amount of data after compression becomes the calculated target value According to a third aspect of the present invention, there is provide a video data compression apparatus having an indicator data calculating means for calculating indicator data indicating a complexity of video data for every picture; a difficulty data calculating means for performing a predetermined computation processing for multiplying a coefficient with the calculated indicator data to calculate difficulty data corresponding to the amount of data after compression of the video data; a target value calculating means for calculating a target value of the amount of data after compression of the video data for every picture based on the calculated difficulty data; a compressing means for compressing each of the pictures of the video data by a predetermined compression method so that the amount of data after compression becomes the calculated target value so as to generate compressed video data; and a coefficient updating means for updating the coefficient based on the amount of data of the generated compressed video data.

According to a fourth aspect of the present invention, there is provided a video data compression method comprising the steps of calculating indicator data indicating a complexity of video data for every picture; performing predetermined computation processing for multiplying a coefficient with the calculated indicator data to calculate difficulty data corresponding to the amount of data after compression; calculating a target value of the amount of data after compression of the noncompressed video data for every picture based on the calculated difficulty data; compressing each of the pictures of the video data by the compression method so that the amount of data after compression becomes the calculated target value so as to generate compressed video data; and updating the coefficient based on the amount of data of the generated compressed video data.

According to a fifth aspect of the present invention, there is provided a video data compression apparatus for compressing a continuous plurality of video data to compressed video data of a picture type sequence containing a plurality of types of pictures (I picture, P picture, and B picture) in a predetermined order, having a rearranging means for rearranging pictures of the noncompressed video data to an order adapted to the compression method so that each head picture of the video data becomes an I picture or a P picture; an indicator data calculating means for calculating indicator data indicating a complexity of the rearranged noncompressed video data for every picture; a border detecting means for detecting a scene change of a continuous plurality of the noncompressed video data; a changing means for changing the picture type sequence so that pictures of any of the noncompressed video data are compressed without reference to the pictures of the other noncompressed video data for every border of a detected scene change; a target value calculating means for calculating a target value of the amount of data after compression of the video data based on the calculated indicator data and the picture type sequence after change; and a compressing means for compressing the video data to compressed video data of the picture type sequence after change so that the amount of data after compression becomes substantially the calculated target value.

According to a sixth aspect of the present invention, there is provided a video data compression method for compressing a continuous plurality of video data to compressed video data of a picture type sequence containing a plurality of types of pictures (I picture, P picture, and B picture) in a predetermined order, comprising the steps of rearranging pictures of the noncompressed video data to an order adapted to the compression method so that each head picture of the video data becomes an I picture or a P picture; calculating indicator data indicating a complexity of the rearranged noncompressed video data for every picture; detecting a scene change of the continuous plurality of the noncompressed video data; changing the picture type sequence so that a picture of any of the noncompressed video data is compressed without reference to a pictures of other noncompressed video data for every border of a detected scene change; calculating a target value of the amount of data after compression of the video data for every predetermined compression unit based on the calculated indicator data and the picture type sequence after change; and compressing the video data to the compressed video data of the picture type sequence after change so that the amount of data after compression becomes substantially the calculated target value.

Note that flatness is defined as an indicator representing a spatial flatness of van image, represents the complexity of the image, and has a correlation with the difficulty (degree of difficulty) of the pattern of the image and the amount of data after compression.

Further, an intra AC is defined as the sum of the dispersion values of the average value of the video data in the pictures and the video data for every DCT block of the DCT processing unit in the MPEG system, represents the complexity of the image, and has a correlation with the difficulty (degree of difficulty) of the pattern of the image and the amount of data after compression similar to the flatness.

Further, an ME residual is defined as the sum of absolute values or the sum of square values of the difference of the video data between the input picture and a reference picture after motion compensation processing by the motion vector at the compression and coding, represents the speed of the motion of the image and the complexity of the pattern, and has a correlation with the difficulty (degree of difficulty) of the pattern of the image and the amount of data after compression similar to the flatness.

Further, the activity is defined as the activity used for determining a quantization value of quantization processing with respect to a macroblock in TM5 [test model 5; ISO/IEC JTC/SC29 (1993)] famous as a compression algorithm of the MPEG system.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

First Embodiment

Below, a first embodiment of the present invention will be explained.

If a plurality of video data having a high coding difficulty such as a pattern having a large number of high frequency components or a pattern having a large amount of motion are compressed and coded by a compression and coding system of video data such as the MPEG system, generally distortion accompanying the compression is apt to occur. For this reason, it is necessary to compress and code video data having a high difficulty with a low compression rate and allocate a larger target amount of data with respect to the compressed video data obtained by compressing and coding the data having a high difficulty in comparison with compressed video data of video data of a pattern having a low difficulty.

In order to adaptively allocate the target amount of data with respect to the difficulty of the video data in this way, the two pass encoding system indicated as the related art is effective. However, the two pass encoding system is not suited to real time compression and coding.

The simplified two pass encoding system indicated as the first embodiment was devised so as to solve the disadvantage of such a two pass encoding system. It can calculate the difficulty of the noncompressed video data from the difficulty data of the compressed video data obtained by preliminarily compressing and coding the noncompressed video data and adaptively control the compression rate of the noncompressed video data delayed by exactly a predetermined time by an FIFO memory or the like based on the difficulty calculated by the preliminary compression and coding.

Figure 1:
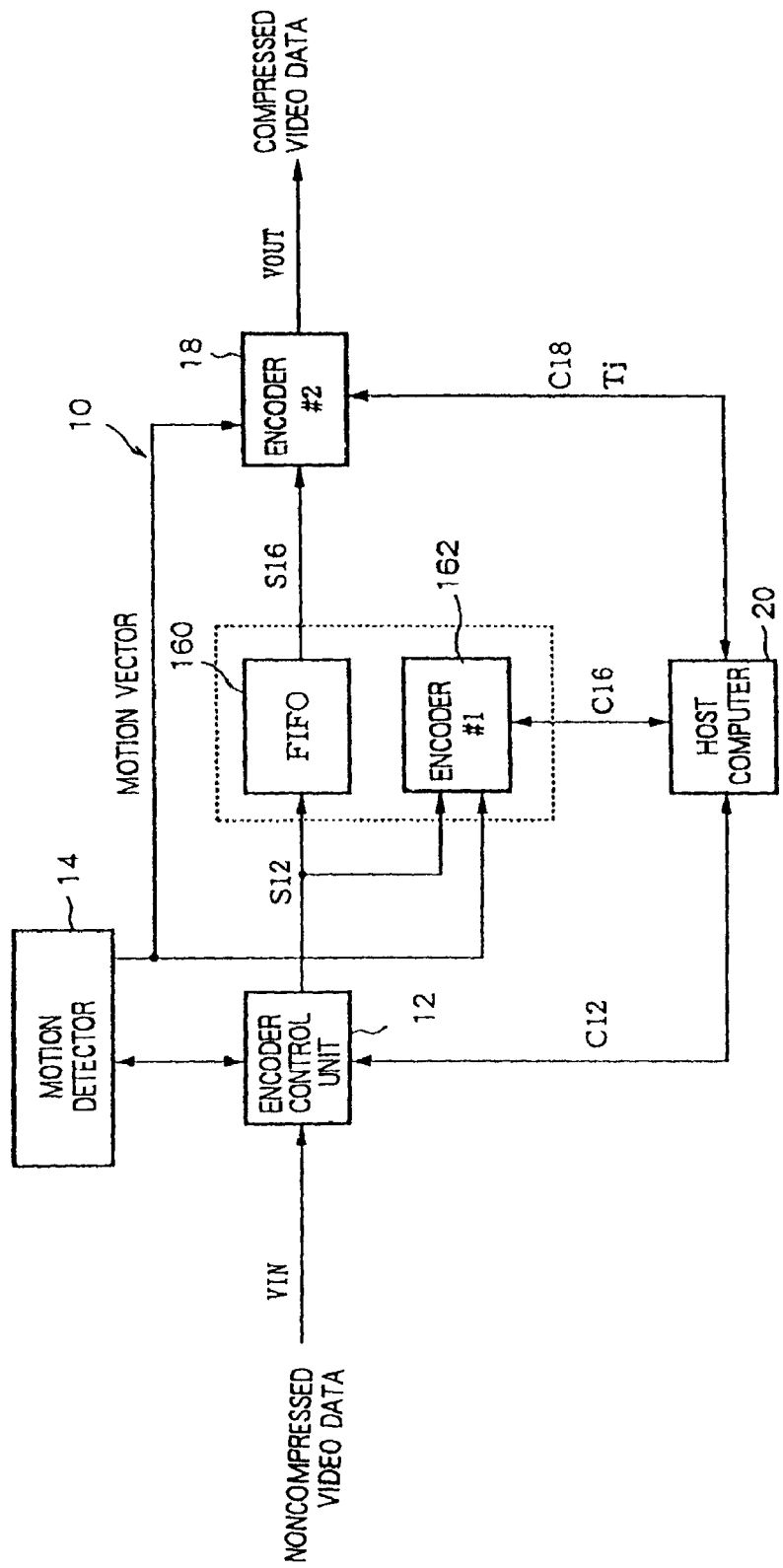
FIG. 1 is a view of the configuration of a video data compression apparatus according to the present invention.

FIG. 1 is a view of the configuration of a video data compression apparatus 1 according to the present invention.

As shown in FIG. 1, the video data compression apparatus 1 is constituted by a compression and coding unit 10 and a host computer 20. The compression and coding unit 10 is constituted by an encoder control unit 12, a motion detector 14, a simplified two pass processing unit 16, and a second encoder 18. The simplified two pass processing unit 16 is constituted by an FIFO memory 160 and a first encoder 162.

The video data compression apparatus 1 realizes the above simplified two pass encoding with respect to the noncompressed video data VIN input from an external apparatus (not illustrated) such as an editing apparatus and a video tape recorder apparatus by these constituent parts.

In the video data compression apparatus 1, the host computer 20 controls the operation of the constituent parts of the video data compression apparatus 1. Further, the host computer 20 receives the amount of data of the compressed video data generated by preliminarily compressing and coding the noncompressed video data VIN by the encoder 162 of the simplified two pass processing unit 16, the value of the direct current component (DC component) of the video data after the DCT processing, and the power value of the alternating current component (AC component) via a control signal C16 and calculates the difficulty of the pattern of the compressed video data based on these received values. Further, the host computer 20 allocates the target amount of data $T_j$ of the compressed video data generated by the encoder 18 via the control signal C18 for every picture based on the calculated difficulty, sets the same in the quantization circuit 168 (FIG. 3) of the encoder 18, and adaptively controls the compression rate of the encoder 18 in units of pictures.

The encoder control unit 12 notifies the existence of a picture of the noncompressed video data VIN to the host computer 20 and further performs the preprocessing for the compression and coding for every picture of the noncompressed video data VIN. That is, the encoder control unit 12 rearranges the input noncompressed video data in the order of coding, performs picture field transformation, performs 3:2 pull down processing (processing for transforming the video data of 30 frames/sec to video data of 24 frames/sec), etc. when the noncompressed video data VIN is the video data of a movie and outputs the same as the video data S12 to the FIFO memory 160 and the encoder 162 of the simplified two pass processing unit 16.

The motion detector 14 performs the detection of the motion vector of the noncompressed video data and outputs the same to the encoder control unit 12 and the encoders 162 and 18.

In the simplified two pass processing unit 16, the FIFO memory 160 delays the video data S12 input from the encoder control unit 12 by exactly a time by which for example L (L is an integer) number of pictures of the noncompressed video data VIN is input and outputs the same as the delayed video data S16 to the encoder 18.

Figure 2:
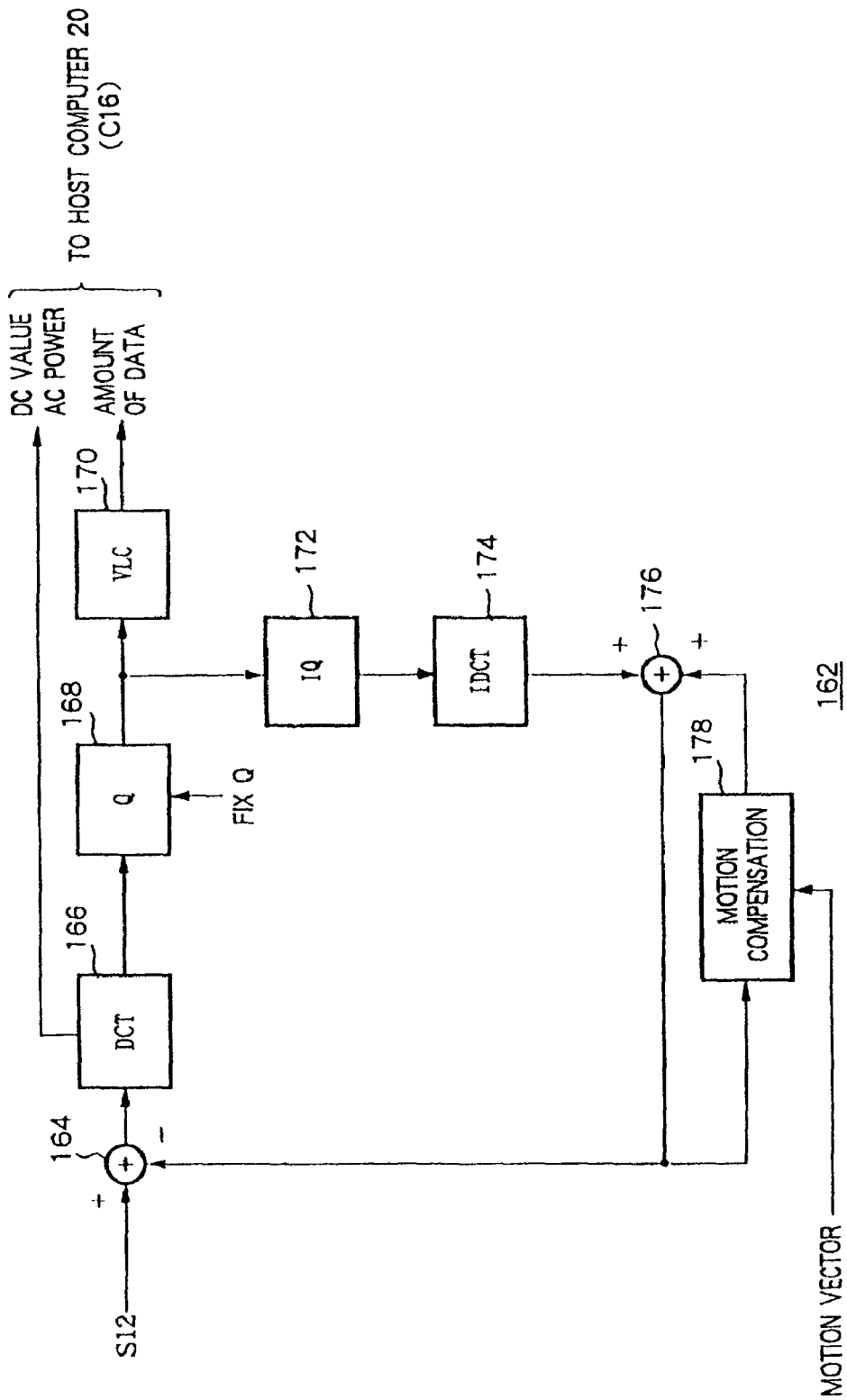
FIG. 2 is a view of the configuration of an encoder of a simplified two pass processing unit shown in FIG. 1.

FIG. 2 is a view of the configuration of the encoder 162 of the simplified two pass processing unit 16 shown in FIG. 1.

The encoder 162 is a video data use compression and coding unit constituted by, for example, as shown in FIG. 2, an adder circuit 164, a DCT circuit 166, a quantization circuit (Q) 168, a variable length coding circuit (VLC) 170, an inverse quantization circuit (IQ) 172, an inverse DCT (IDCT) circuit 174, an adder circuit 176, and a motion compensation circuit 178, compresses and codes the input video data S12 by the MPEG system or the like, and outputs the amount of data etc. for every picture of the compressed video data to the host computer 20.

The adder circuit 164 subtracts the output data of the adder circuit 176 from the video data S12 and outputs the result to the DCT circuit 166.

The DCT circuit 166 performs discrete cosine transformation (DCT) processing on the video data input from the adder circuit 164 in units of DCT blocks consisting of for example 8 pixels×8 pixels, transforms the same from data of the time domain to data of the frequency domain, and outputs the result to the quantization circuit 168. Further, the DCT circuit 166 outputs the value of the DC component of the video data after DCT and the power value of the AC component to the host computer 20.

The quantization circuit 168 quantizes the data of the frequency domain input from the DCT circuit 166 by the fixed quantization value Q and outputs the result as the quantized data to the variable length coding circuit 170 and the inverse quantization circuit 172.

The variable length coding circuit 170 performs variable length coding on the quantized data input from the quantization circuit 168 and outputs the amount of data of the compressed video data obtained as a result of the variable length coding via the control signal C16 to the host computer 20.

The inverse quantization circuit 172 performs inverse quantization on the quantized data input from the quantization circuit 168 and outputs the same as the inverse quantized data to the inverse DCT circuit 174.

The inverse DCT circuit 174 performs inverse DCT processing on the inverse quantized data input from the inverse quantization circuit 172 and outputs the result to the adder circuit 176.

The adder circuit 176 adds the output data of the motion compensation circuit 178 and the output data of the inverse DCT circuit 174 and outputs the result to the adder circuit 164 and the motion compensation circuit 178.

The motion compensation circuit 178 performs the motion compensation processing based on the motion vector input from the motion detector 14 on the output data of the adder circuit 176 and outputs the result to the adder circuit 176.

Figure 3:
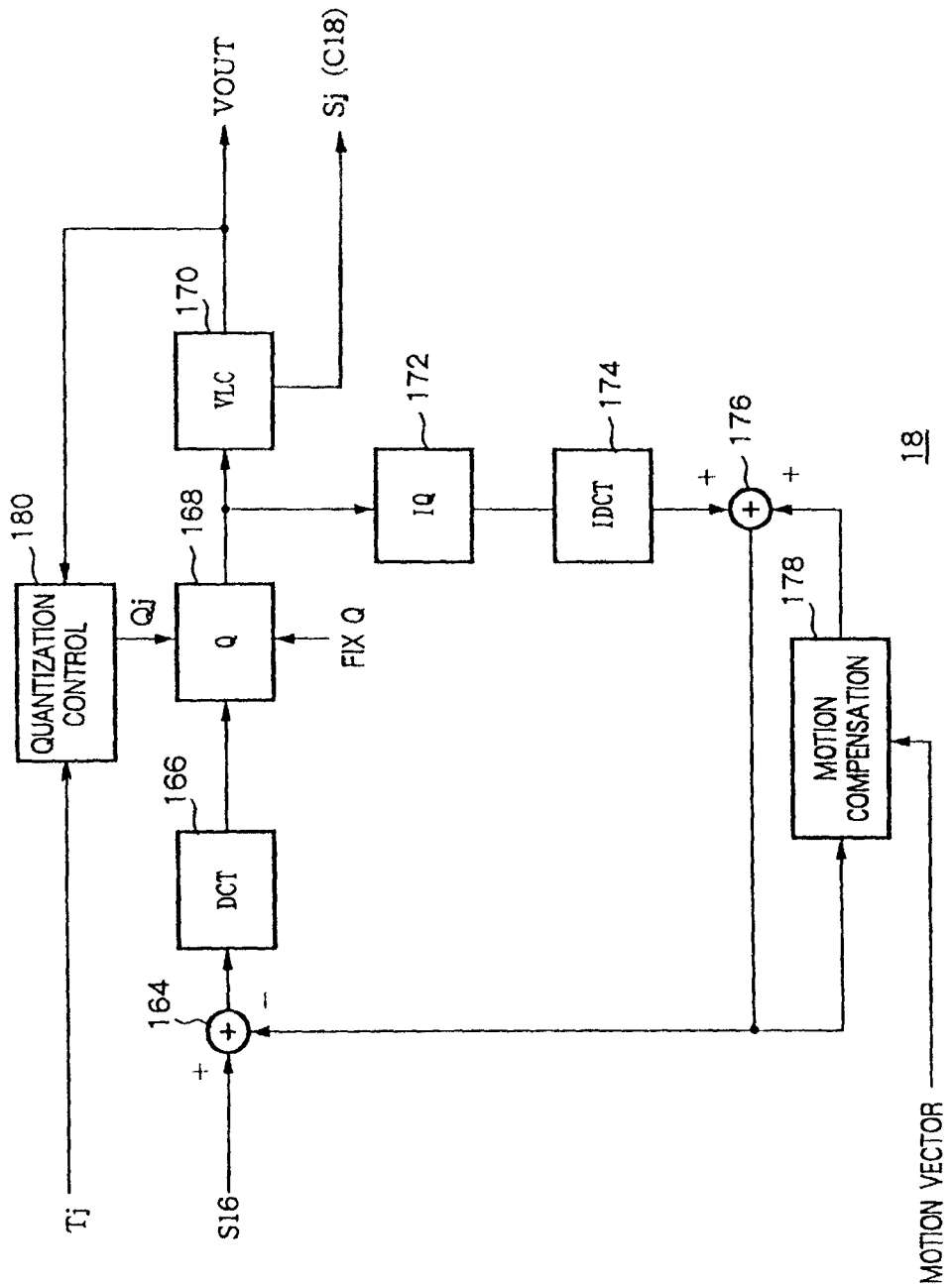
FIG. 3 is a view of the configuration of the encoder shown in FIG. 1.

FIG. 3 is a view of the configuration of the encoder 18 shown in FIG. 1.

As shown in FIG. 3, the encoder 18 is configured as the encoder 162 shown in FIG. 2 plus the quantization control circuit 180. The encoder 18 applies the motion compensation processing, DCT processing, quantization processing, and variable length coding processing with respect to the delayed video data S16 delayed by the amount of L pictures by the FIFO memory 160 by these constituent parts based on the target amount of data $T_j$ set from the host computer 20 to generate the compressed video data VOUT of the MPEG system or the like and outputs the result to an external apparatus (not illustrated).

In the encoder 18, the quantization control circuit 180 successively monitors the amount of data of the compressed video data VOUT output by the variable length quantization circuit 170 and successively adjusts the quantization value $Q_j$ to be set in the quantization circuit 168 so that the amount of data of the compressed video data finally generated from the j-th picture of the delayed video data S16 approaches the target amount of data $T_j$ set from the host computer 20.

Further, the variable length quantization circuit 170 outputs the compressed video data VOUT to the outside and in addition outputs the actual amount of data $S_j$ of the compressed video data VOUT obtained by compressing and coding the delayed video data S16 via the control signal C18 to the host computer 20.

Below, an explanation will be made of the simplified two pass encoding operation of the video data compression apparatus 1 in the first embodiment.

Figure 4:
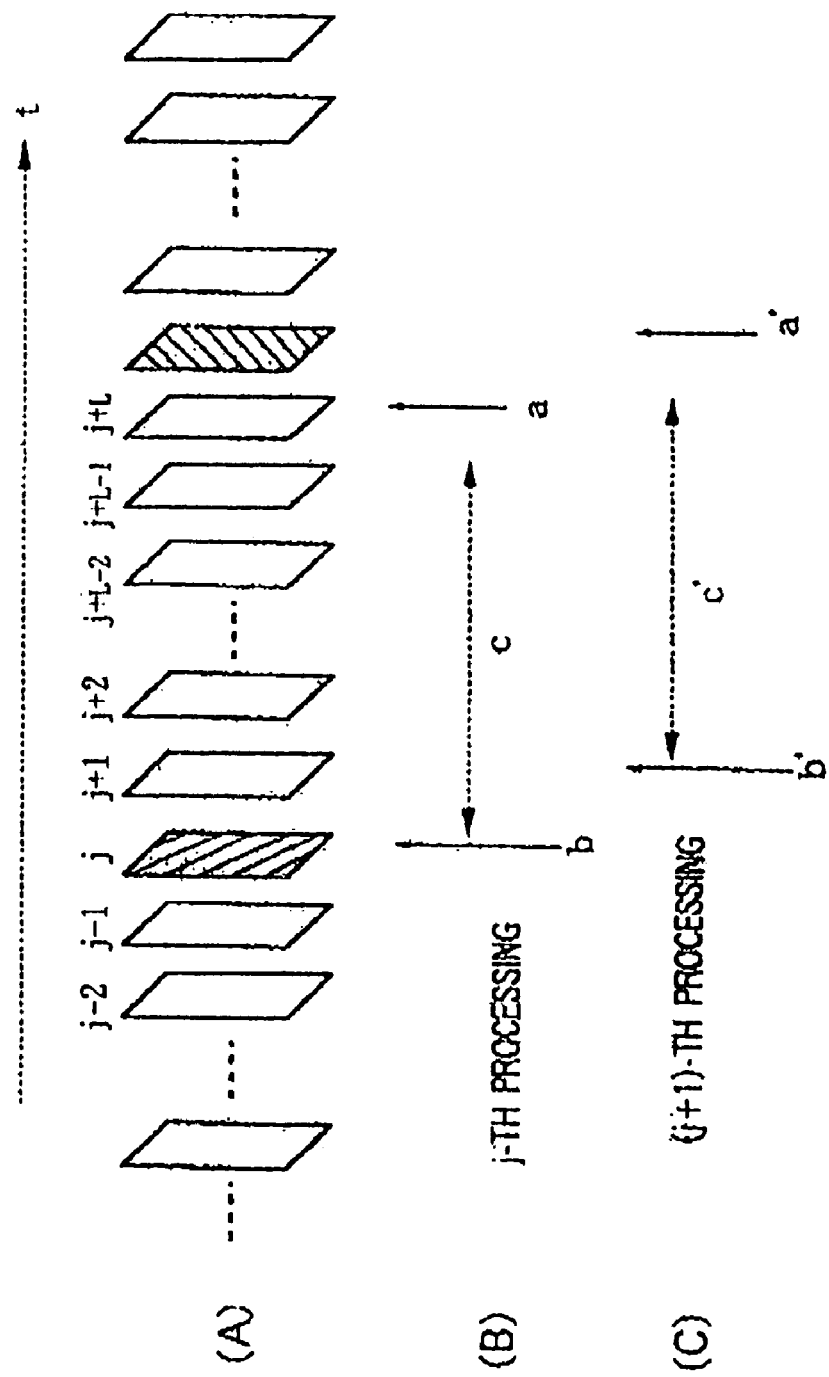
FIGS. 4A to 4C are views of an operation of the simplified two pass encoding of the video data compression apparatus according to a first embodiment of the present invention

FIGS. 4A to 4C are views of the operation of the simplified two pass encoding of the video data compression apparatus 1 in the first embodiment.

The encoder control unit 12 performs the preprocessing of rearrangement of pictures in the order of coding etc. with respect to the noncompressed video data VIN input to the video data compression apparatus 1, as shown in FIG. 4A, and outputs the same as the video data S12 to the FIFO memory 160 and the encoder 162.

Note that, due to the rearrangement of the order of pictures by the encoder control unit 12, the order of coding of the pictures shown in FIGS. 4A to 4C etc. and the order indicated after expansion and decoding are different.

The FIFO memory 160 delays the pictures of the input video data S12 by exactly the amount of L pictures and outputs the same to the encoder 18.

The encoder 162 preliminarily successively compresses and codes the pictures of the input video data S12 and outputs the amount of data of the compressed and coded data obtained by compressing and coding the j (j is an integer)-th picture, the value of the DC component of the video data after the DCT processing, and the power value of the AC component to the host computer 20.

For example, since the delayed video data S16 input to the encoder 18 is delayed by exactly the amount of L pictures by the FIFO memory 160, as shown in FIG. 4B, when the encoder 18 compresses and codes the j (j is an integer)-th picture (picture a of FIG. 4B) of the delayed video data S16, the encoder 162 compresses and codes the (j+L)-th picture (picture b of FIG. 4B) advanced from the j-th picture of the video data S12 by the amount of L pictures. Accordingly, when the encoder 18 starts the compression and coding of the j-th picture of the delayed video data S16, the encoder 162 has completed the compression and coding of the j-th to (j+L−1)-th pictures (range c of FIG. 4B) of the video data S12, and the real difficulty data $D_j, D_{j+1}, D_{j+2}, \ldots, D_{j+L-1}$ after compression and coding of these pictures have been already calculated by the host computer 20.

The host computer 20 calculates the target amount of data $T_j$ to be allocated to the compressed video data obtained by compressing and coding the j-th picture of the delayed video data S16 by the encoder 18 by the following Equation 1 and sets the calculated target amount of data $T_j$ in the quantization control circuit 180.

$$T_j = R'_j \frac{D_j}{\sum_{k=j}^{j+L-1} D_k} \quad (1)$$

Note, in Equation 1, $D_j$ is the real difficulty data of the j-th picture of the video data S12, $R'_j$ is an average of the target amount of data which can be allocated to the j-th to the (j+L−1)-th pictures of the video data S12 and S16, and an initial value $(R'_1)$ of $R'_j$ is the target amount of data which can be allocated to pictures of the compressed video data on the average, represented by following Equation 2, and updated as shown in Equation 3 whenever the encoder 18 generates one picture's worth of the compressed video data.

$$R'_1 = (Bit\_rate \times L)/Picture\_rate \quad (2)$$

$$R'_{j+1} = R'_j - S_j + F_{j+L} \quad (3)$$

Note that, the numerical value bit rate (Bit_rate) in Equation 2 indicates the amount of data (amount of bits) per second determined based on the transmission capacity of the communication line and the recording capacity of the recording medium, "Picture_rate" indicates the number of pictures per second contained in the video data (30 pictures/sec (NTSC), 25 pictures/sec (PAL)), and the numerical value $F_{j+L}$ in Equation 3 indicates the average amount of data per picture determined in accordance with the picture type.

The DCT circuit 166 of the encoder 18 performs DCT processing on the j-th picture of the input delayed video data S16 and outputs the result to the quantization circuit 168.

The quantization circuit 168 quantizes the data of the frequency domain of the j-th picture input from the DCT circuit 166 by the quantization value $Q_j$ adjusted based on the target amount of data $T_j$ by the quantization control circuit 180 and outputs the result as the quantized data to the variable length coding circuit 170.

The variable length coding circuit 170 performs variable length coding on the quantized data of the j-th picture input from the quantization circuit 168 so as to generate the compressed video data VOUT of an amount of data near the target amount of data $T_j$ and outputs the same.

Similarly, as shown in FIG. 4B, when the encoder 18 compresses and codes the (j+1)-th picture (picture a' of FIG. 4C) of the delayed video data S16, the encoder 162 completes the compression and coding of the (j+1)-th to (j+L)-th pictures (range c' of FIG. 4C) of the video data S12. The real difficulty data $D_{j+1}, D_{j+2}, D_{j+3}, \ldots, D_{j+L-1}$ of these pictures have been already calculated by the host computer 20.

The host computer 20 calculates the target amount of data $T_{j+1}$ to be allocated to the compressed video data obtained by compressing and coding the (j+1)-th picture of the delayed video data S16 by the encoder 18 by Equation 1 and sets the same in the quantization control circuit 180 of the encoder 18.

The encoder 18 compresses and codes the (j+1)-th picture based on the target amount of data $T_j$ set in the quantization control circuit 180 from the host computer 20 so as to generate the compressed video data VOUT of an amount of data near the target amount of data $T_{j+1}$ and outputs the same.

Further, below, similarly, the video data compression apparatus 1 successively compresses and codes the k-th picture of the delayed video data S16 by changing the quantization value $Q_k$ (k=j+2, j+3, . . . ) for every picture and outputs the result as the compressed video data VOUT.

As explained above, according to the video data compression apparatus 1 shown in the first embodiment, the difficulty of the pattern of the noncompressed video data VIN can be calculated in a short time and the noncompressed video data VIN can be adaptively compressed and coded with a compression rate in accordance with the calculated difficulty. That is, according to the video data compression apparatus 1 shown in the first embodiment, the noncompressed video data VIN can be adaptively compressed and coded in almost real time based on the difficulty of the pattern of the noncompressed video data VIN unlike the two pass encoding system, and thus the apparatus can be applied to applications such as live broadcasts in which a real time property is required.

Note that, in addition to that shown in the first embodiment, the data video data compression apparatus 1 according to the present invention can adopt various other configurations, for example, the amount of data of the compressed video data compressed and coded by the encoder 162 may be used as it is as the difficulty data so as to simplify the processing of the host computer 20.

Second Embodiment

Below, a second embodiment of the present invention will be explained.

The simplified two pass encoding system shown in the first embodiment is an excellent system capable of performing compression and coding by giving only a delay of about one GOP (for example 0.5 second) to the input noncompressed video data and generating compressed video data of suitable amounts of data.

In this system, however, two encoders are required. In general, an encoder for compressing and coding video data requires large hardware and is very expensive even if formed as an integrated circuit. In addition, it is large in size. Accordingly, the necessity of two encoders in this system prevents a reduction of the cost of the apparatus, a reduction of size, and saving of electric power. Further, it is desirable that the time delay required for the compression and coding be as short as possible, but the processing for calculation of the real difficulty data $D_j$ and the predictive difficulty data $D_j'$ and the preliminary compression and coding processing per se require a few pictures' worth of processing time, therefore these processings per se become a factor preventing the shortening of the time delay.

The second embodiment was made so as to solve such a disadvantage and provides a video data compression method capable of generating compressed video data of suitable amounts of data equivalent to the simplified two pass encoding system by only using one encoder and in addition requiring a shorter time delay for the processing.

Figure 5:
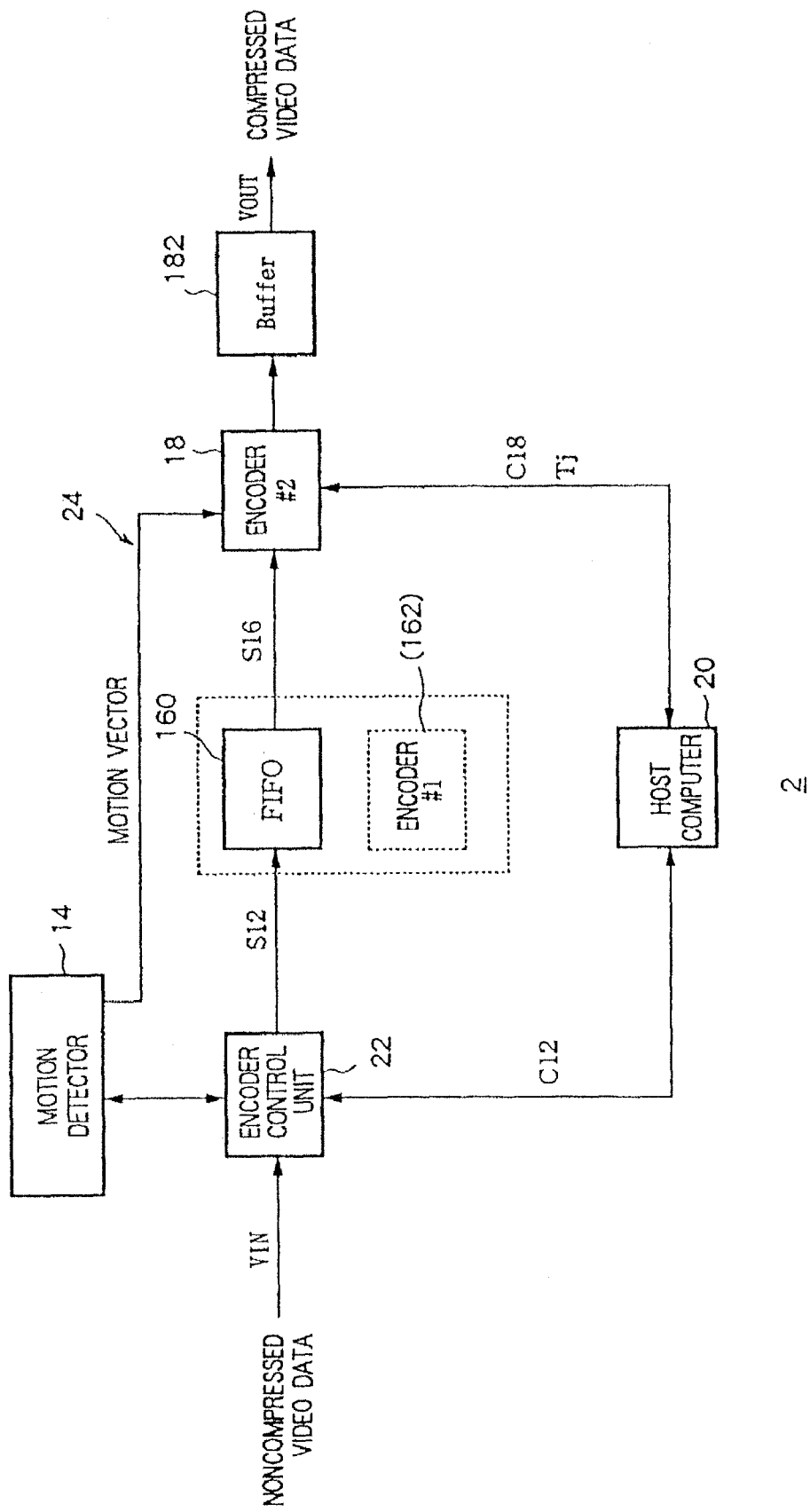
FIG. 5 is a schematic view of the configuration of the video data compression apparatus according to a second embodiment of the present invention.

FIG. 5 is a schematic view of the configuration of a video data compression apparatus 2 according to a second embodiment of the present invention.

Figure 6:
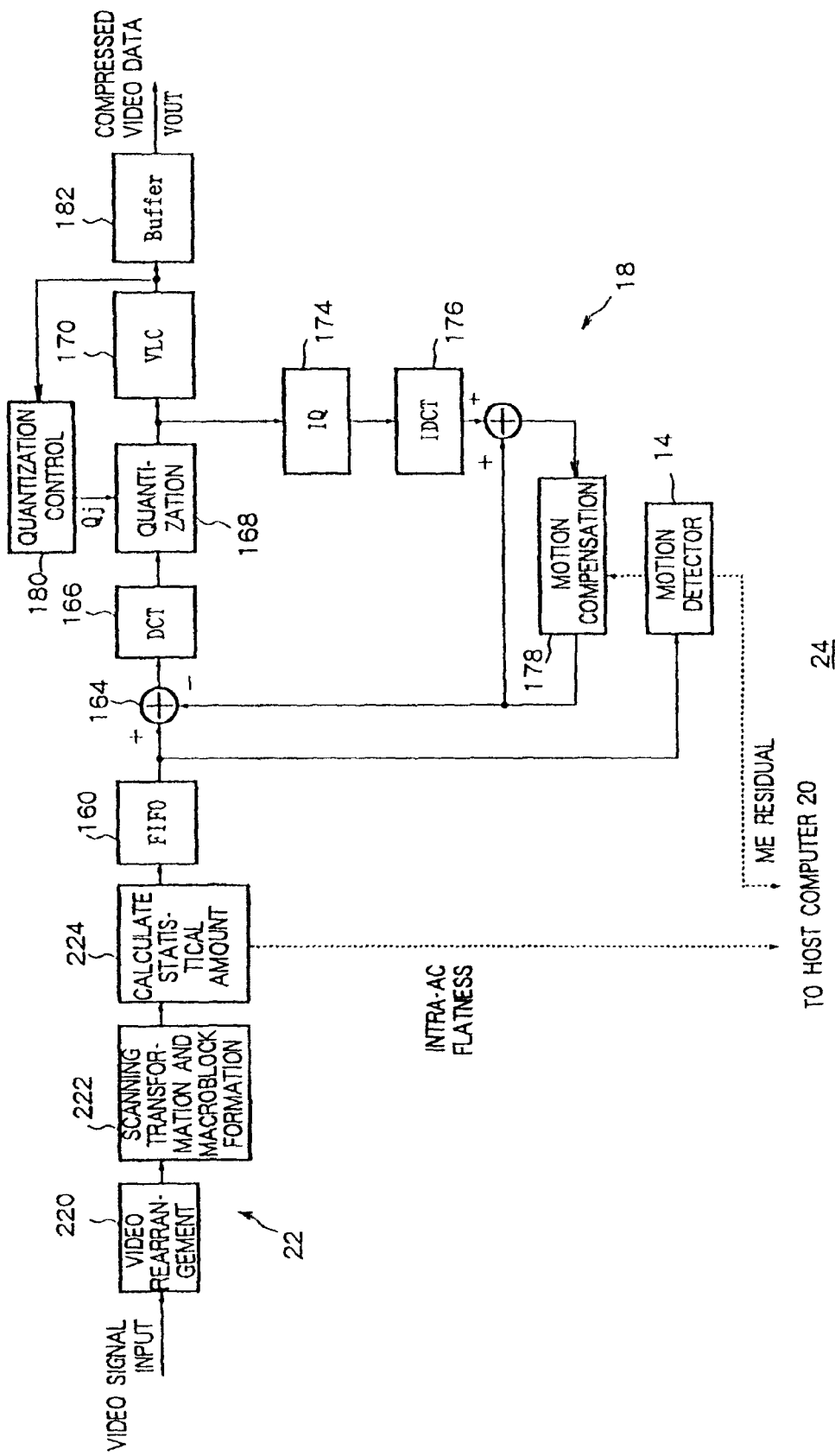
FIG. 6 is a detailed view of the configuration of a compression and coding unit of the video data compression apparatus shown in FIG. 5.

FIG. 6 is a detailed view of the configuration of a compression and coding unit 24 of the video data compression apparatus 2 shown in FIG. 5.

Note that, in FIG. 5 and FIG. 6, among the constituent parts of the video data compression apparatus 2, the parts the same as the constituent parts of the video data compression apparatus 1 explained in the first embodiment (FIG. 1 and FIG. 2) are indicated by same symbols or numerals.

As shown in FIG. 5, the video data compression apparatus 2 adopts a configuration in which the compression and coding unit 10 of the video data compression apparatus 1 (FIG. 1 and FIG. 2) is replaced by a compression and coding unit 24 obtained by excluding the encoder 162 from the compression and coding unit 10, replacing the encoder control unit 12 by the encoder control unit 22, and adding a buffer memory (buffer) 182.

As shown in FIG. 6, the compression and coding unit 24 is constituted by an image rearranging circuit 220, a scanning transforming and macroblock forming circuit 222, and a statistical amount (parameter) calculation circuit 224. The rest of the constituent parts of the compression and coding unit 24 adopt the same configurations as those of the compression and coding unit 10.

The encoder control unit 22 notifies the existence of a picture of the noncompressed video data VIN to the host computer 20 similar to the encoder control unit 12 and further performs the preprocessing for compression and coding for every picture of the noncompressed video data VIN.

In the encoder control unit 22, the image rearranging circuit 220 rearranges the input noncompressed video data in the order of coding.

The scanning transforming and macroblock forming circuit 222 performs the picture field transformation and performs the 3:2 pull down processing etc. where the source of the noncompressed video data VIN is the video data of a movie.

The statistical amount calculation circuit 224 calculates a statistical amount such as the flatness and intra AC from the pictures processed by the image rearranging circuit 220 and the scanning transforming and macroblock forming circuit 222 and compressed and coded to I pictures.

The video data compression apparatus 2 uses a statistical amount (flatness, intra AC) of the noncompressed video data and the predictive error amount (ME residual) of motion prediction in place of the difficulty of the pattern of the noncompressed video data VIN by these constituent parts, adaptively calculates the target amount of data $T_j$ similar to the video data compression apparatus 1 (FIG. 1 and FIG. 2), and performs high precision feed forward control to compress and code the noncompressed video data VIN to compressed video data of suitable amounts of data.

Note that, in the video data compression apparatus 2, the target amount of data $T_j$ is determined by the motion detector 14 and the statistical amount calculation circuit 224 of the encoder control unit 22 based on the indicator data (parameter) detected in advance. Therefore, below, the compression and coding system in the video data compression apparatus 2 will be referred to as a feed forward rate control (FFRC) system.

Note that, the ME residual is defined as the sum of the absolute values or the sum of the square values of the difference of the video data between pictures to be compressed and a reference picture, is calculated from the pictures which become the P pictures and B pictures after compression by the motion detector 14, represents the speed of the motion of the image and the complexity of the pattern, and has a correlation with the difficulty and the amount of data after compression similar to the flatness.

The I picture is compressed and coded without reference to other pictures, so the ME residual cannot be found. Therefore, the flatness and intra AC are used as the parameters in place of the ME residual.

Further, flatness is a parameter newly defined as an indicator representing the spatial flatness of the image so as to realize the video data compression apparatus 2, indicates the complexity of the video, and has a correlation with the difficulty (degree of difficulty) of the pattern of the image and the amount of data after the compression.

Further, the intra AC is a parameter newly defined as the sum of the dispersion values of the video data for every DCT block of the DCT processing unit in the MPEG system so as to realize the video data compression apparatus 2, indicates the complexity of the image, and has a correlation with the difficulty of the pattern of the image and the amount of data after the compression similar to the flatness.

Below, an explanation will be made of the ME residual, flatness, and intra AC.

In the simplified two pass encoding system explained in the first embodiment, the real difficulty data $D_j$ indicated the difficulty of the pattern of the image and the target amount of data $T_j$ was calculated based on the real difficulty data $D_j$.

In order to make the amount of data of the compressed video data generated by the encoder 18 approach the value indicated by the target amount of data $T_j$, the quantization value $Q_j$ is controlled in the quantization circuit 168 (FIG. 2 and FIG. 6). Accordingly, if a parameter obtained without compressing and coding the video data and adequately indicating the complexity (difficulty) of the video data similar to the real difficulty data $D_j$ can be obtained before the quantization processing in the quantization circuit 168 of the encoder 18, it would be possible to achieve the objectives of eliminating the encoder 162 (FIG. 1) and shortening the processing delay time. The ME residual, the flatness, and the intra AC have a strong correlation with the real difficulty data $D_j$ and therefore are adequate for achieving these objectives.

Relationship Between ME Residual and Real Difficulty Data $D_j$

When performing compression and coding processing by referring to other pictures to generate the P pictures and B pictures, the motion detector 14 searches for a macroblock giving the smallest sum of the absolute values or sum of the square values of the difference between a particular macroblock of the picture (input picture) to be compressed and the picture referred to (reference picture) so as to find the motion vector. The ME residual is defined as the value obtained by adding up the sums of absolute values or sums of the squares of the differences of each of macroblocks giving the smallest sums for all of the pictures when finding the motion vector in this way.

Figure 7:
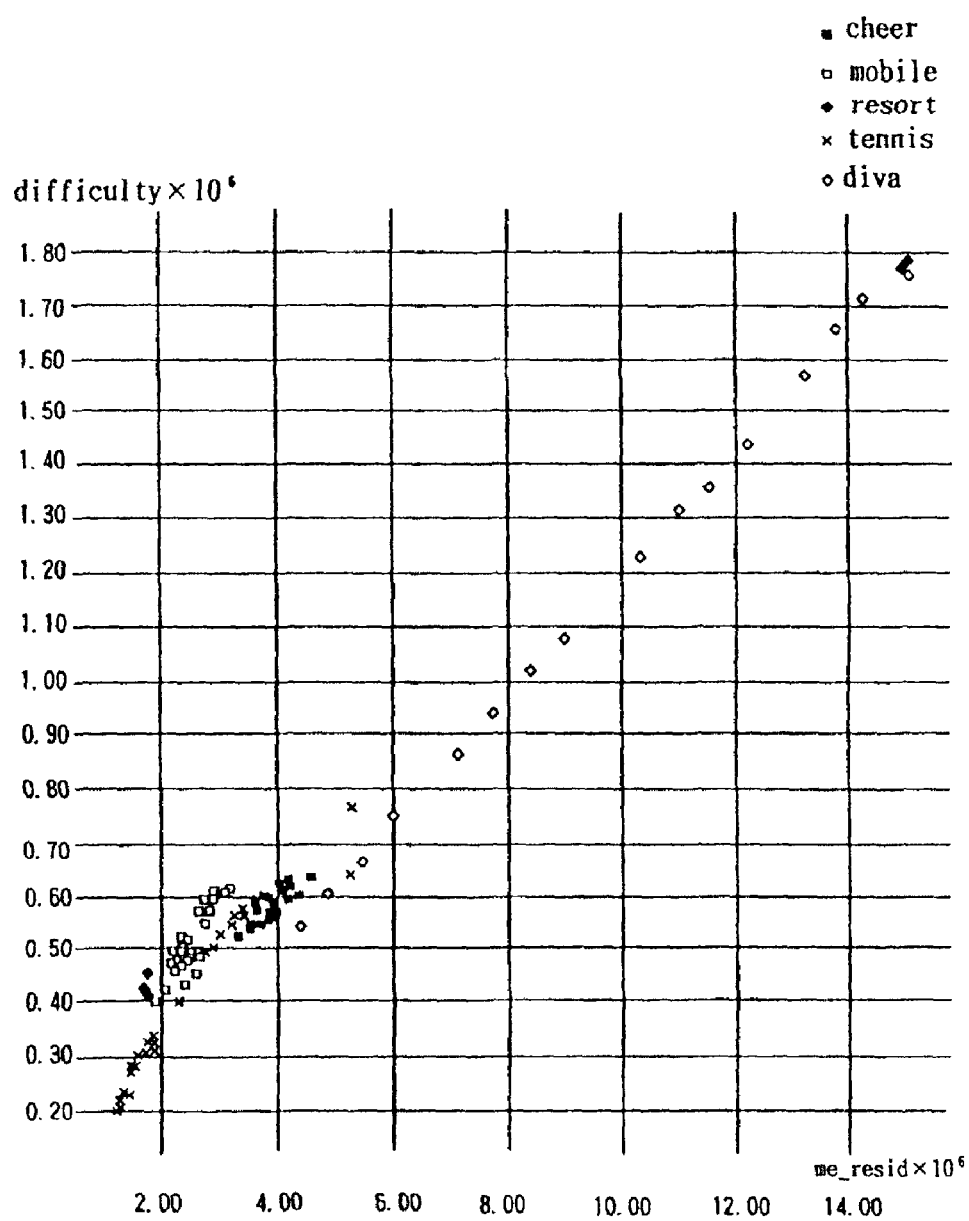
FIG. 7 is a view of the correlation between an ME residual and a real difficulty data $D_j$ when producing a P picture by the video data compression apparatus shown in FIG. 1 and FIG. 5.

FIG. 7 is a view of the correlation between the ME residual and the real difficulty data $D_j$ when generating a P picture by the video data compression apparatuses 1 and 2.

Figure 8:
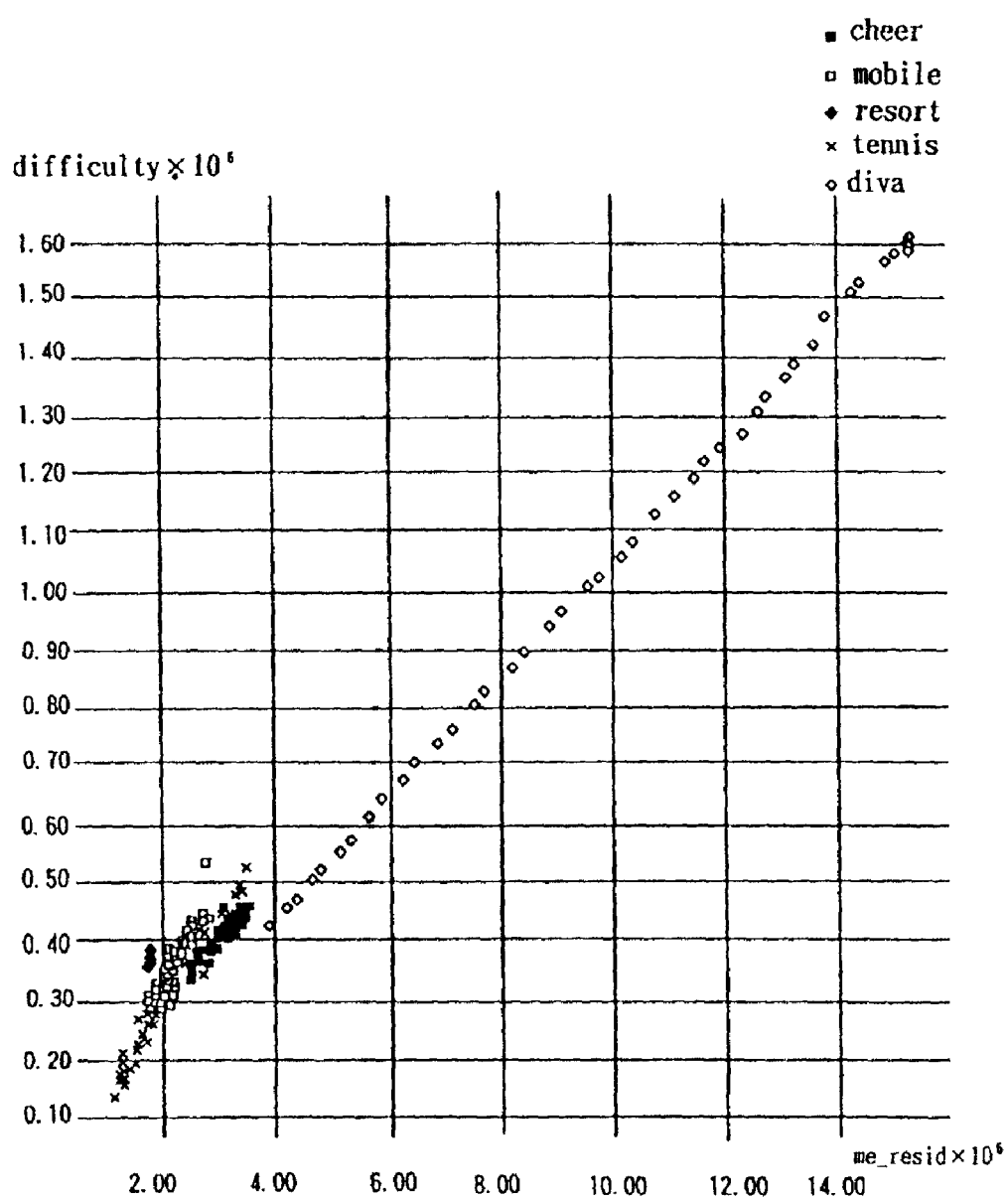
FIG. 8 is a view of the correlation between the ME residual and the real difficulty data $D_j$ when producing a B picture by the video data compression apparatus shown in FIG. 1 and FIG. 5.

FIG. 8 is a view of the correlation between the ME residual and the real difficulty data $D_j$ when generating a B picture by the video data compression apparatuses 1 and 2.

Note that, in FIG. 7 and FIG. 8, as the real difficulty data $D_j$, use is made of the amount of data of the compressed video data obtained by compression and coding by using a fixed quantization value by the encoder 18 (below, the same in FIG. 10 and FIG. 11), and FIG. 7 and FIG. 8 are graphs of the relationship between the ME residual and the real difficulty data $D_j$ obtained where standard images ["cheer" (cheer leaders), "mobile" (mobile and calendar), "tennis" (table tennis), and "diva" (diva with noise)] standardized by the CCIR and other images ("resort") are actually compressed and coded by the MPEG system. In FIG. 7 and FIG. 8, an ordinate of the graph (difficulty) indicates the real difficulty data $D_j$, and abscissa (me resid) indicates the ME residual.

As understood when referring to FIG. 7 and FIG. 8, the ME residual has a strong correlation with the real difficulty data $D_j$. Accordingly, in place of the real difficulty data $D_j$ of a picture which becomes a P picture or a B picture after compression, the ME residual can be used for the generation of the target amount of data $T_j$.

Relationship Between Flatness and Real Difficulty Data $D_j$

Figure 9:
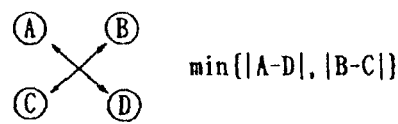
FIG. 9 is a view of a method of calculation of flatness.

FIG. 9 is a view of the method of calculation of the flatness.

The flatness is calculated by dividing each of the DCT blocks which serve as the units of DCT processing in the MPEG system into small blocks each consisting of 2 pixels×2 pixels as shown in FIG. 9, calculating the difference of the data of the diagonal pixels (pixel values) in these small blocks, comparing the difference with a predetermined threshold value, and further finding the sum of small blocks in which the difference becomes smaller than the threshold value for every picture.

Note that the value of the flatness becomes smaller as the pattern of the video becomes spatially more complex and becomes larger when it is flatter.

Figure 10:
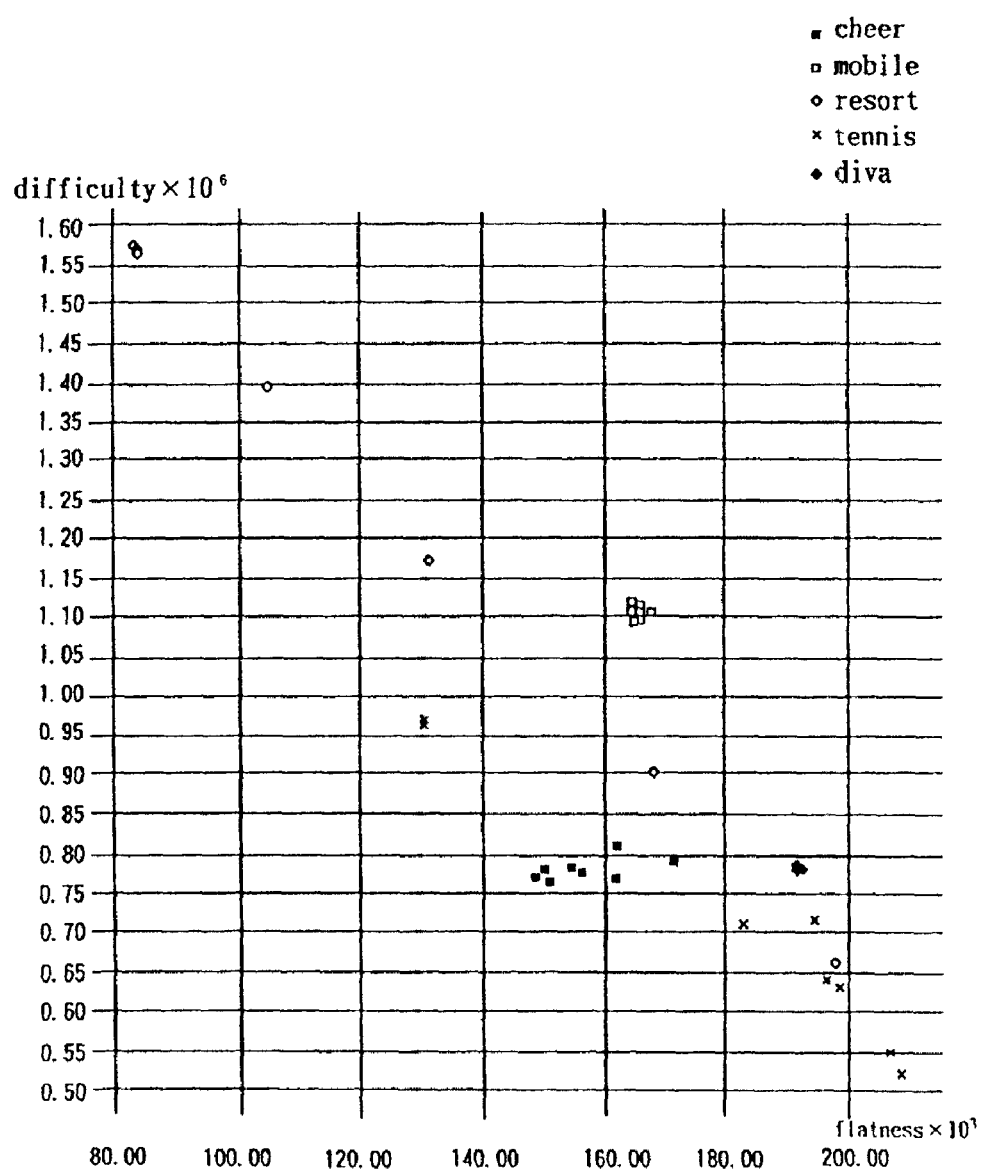
FIG. 10 is a view of the correlation between the flatness and the real difficulty data $D_j$ when producing an I picture by the video data compression apparatus shown in FIG. 1 and FIG. 5.

FIG. 10 is a view of the correlation between the flatness and the real difficulty data $D_j$ when generating an I picture by the video data compression apparatuses 1 and 2.

Note that, FIG. 10 is a graph of the relationship between the flatness and the real difficulty data $D_j$ obtained when the standard images standardized by the CCIR and other images are actually compressed and coded by the MPEG system. In FIG. 10, the ordinate of the graph (difficulty indicates the real difficulty data $D_j$, and the abscissa (flatness) indicates the flatness.

As shown in FIG. 10, there is a strong negative correlation between the flatness and the real difficulty data $D_j$, and it is seen that the real difficulty data $D_j$ can be approximated by the method of substituting the flatness into the primary function etc.

Relationship Between Intra AC and Real Difficulty Data $D_j$

The intra AC is calculated as the sum of the absolute values of the difference between the pixel value of each pixel in a DCT block (8×8 pixels) and the average value (Σ) of the pixel values (Pk) in the DCT block for every DCT block. That is, the intra AC can be found by the following equation 4.

$$Intra - AC_j = \sum_{picture} \sum_{k=1}^{64} |P_k - \overline{P}| \tag{4}$$

$$\overline{P} = \frac{1}{64}\sum_{k=1}^{64} P_k$$

Figure 11:
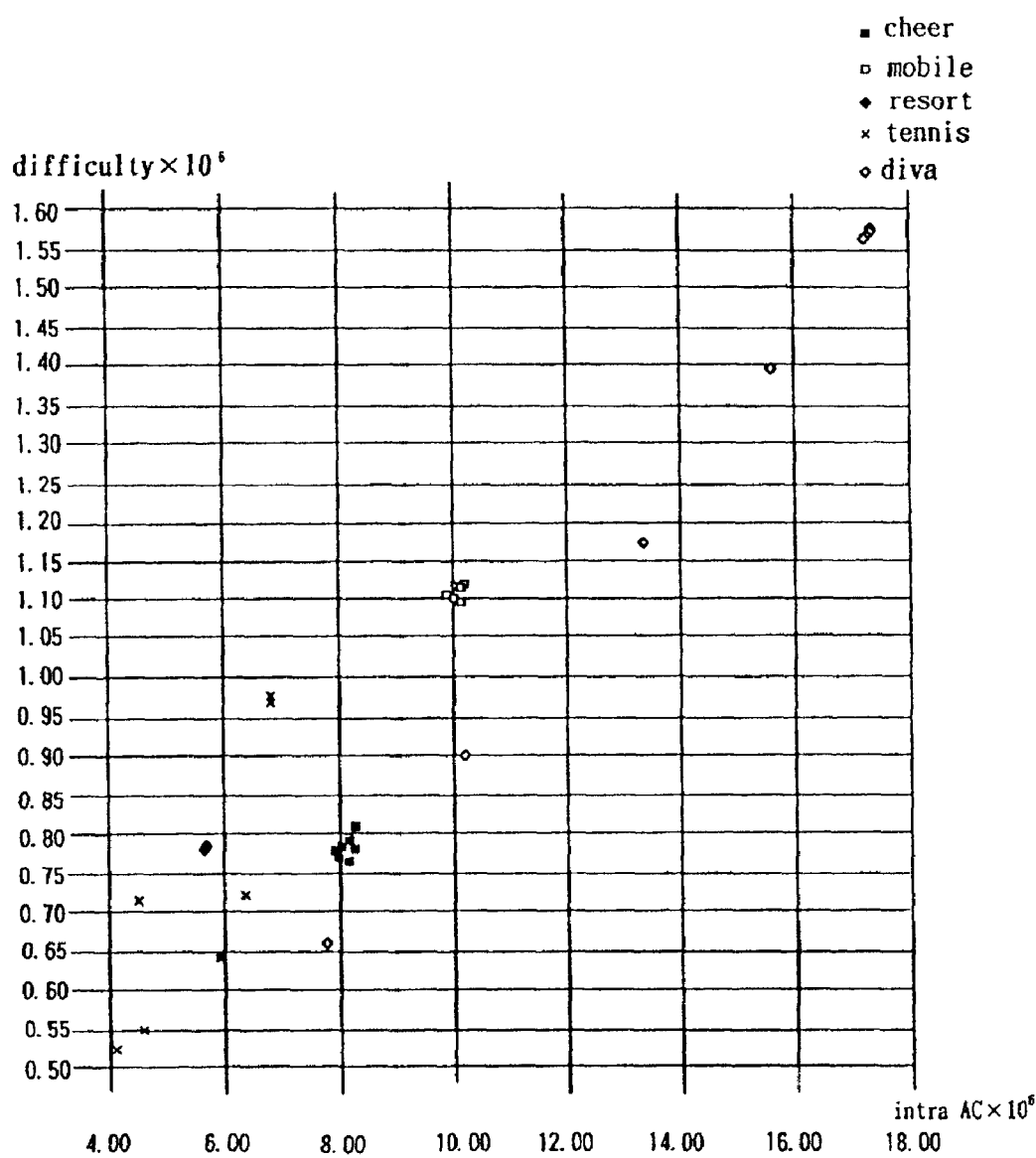
FIG. 11 is a view of the correlation between the flatness and the real difficulty data $D_j$ when producing an I picture by the video data compression apparatus shown in FIG. 1 and FIG. 5.

FIG. 11 is a view of the correlation between the intra AC and real difficulty data $D_j$ when generating an I picture by the video data compression apparatuses 1 and 2.

Note that, FIG. 11 is a graph showing the relationship between the intra AC and the real difficulty data $D_j$ obtained where the standard images standardized by the CCIR and other images are actually compressed and coded by the MPEG system. In FIG. 11, the ordinate of the graph (difficulty) indicates the real difficulty data $D_j$, and the abscissa (intra AC) indicates the intra AC.

As explained heretofore, it is seen that the real difficulty data $D_j$ can be approximated by the primary function etc. by each indicator data (statistical amount). Accordingly, it is possible to calculate the real difficulty data $D_j$ of each picture type as follows.

The real difficulty data $D_j$ is approximated by the ME residual ($ME_j$) by the following Equation 5 for a P picture and by the following Equation 6 for a B picture. Further, the real difficulty data $D_j$ is approximated by the flatness ($FR_j$) and intra AC (Intra $AC_j$) or either of them by approximation equations (Equations 7 and 8) similar to Equations 5 and 6 for an I picture.

$$D_j = a_P \times ME_j + b_P \tag{5}$$

$$D_j = a_B \times ME_j + b_B \tag{6}$$

$$D_j = a_I \times FR_j + b_I \tag{7}$$

$$D_j = a'_I \times (\text{intra } AC_j) + b'_I \tag{8}$$

Here, $a_P$, $a_B$, $a_I$, and $a_I'$ are proportional coefficients.

Further, in the simplified two pass encoding system shown in the first embodiment, the target amount of data $T_j$ was calculated by substituting the real difficulty data $D_j$ obtained by these approximations into Equation 1.

Below, the operation of the video data compression apparatus 2 will be explained by taking as an example a case where the real difficulty data $D_j$ is approximated by the ME residual, the flatness, and the intra AC and the noncompressed video data is compressed and coded by the simplified two pass encoding system.

In the encoder control unit 22, the image rearranging circuit 220 rearranges the noncompressed video data VIN in pictures in the order of coding. The scanning transformation and macroblock forming circuit 222 performs the picture field transformation etc. The statistical amount calculation circuit 224 performs the computation processing shown in FIG. 9 and Equation 4 with respect to a picture to be compressed and coded to an I picture and calculates a statistical amount such as the flatness and intra AC.

The motion detector 14 generates motion vectors for the pictures to be compressed and coded to a P picture and B picture and further calculates the ME residual.

The FIFO memory 160 delays the input video data by exactly an amount of L pictures.

The host computer 20 performs the computation processing shown in Equation 7 and Equation 8 with respect to the ME residual generated by the motion detector 14 to approximate the real difficulty data $D_j$ and performs the computation processing similar to Equation 7 and Equation 8 to approximate the real difficulty data $D_j$ by the flatness and the intra AC.

Further, the host computer 20 substitutes the approximated real difficulty data $D_j$ into Equation 1 to calculate the target amount of data $T_j$ and sets the calculated target amount of data $T_j$ in the quantization control circuit 180 of the encoder 18.

The DCT circuit 166 of the encoder 18 performs DCT processing on the j-th picture of the delayed video data.

The quantization circuit 168 quantizes the data of the frequency domain of the j-th picture input from the DCT circuit 166 by the quantization value $Q_j$ adjusted by the quantization control circuit 180 based on the target amount of data $T_j$.

The variable length coding circuit 170 performs variable length coding on the quantized data of the j-th picture input from the quantization circuit 168, generates the compressed video data VOUT of an amount of data near the target amount of data $T_j$, and outputs the same via the buffer memory 182 to an external unit.

Note that, in the TM5 system or the like known as the compression algorithm of the MPEG, to calculate the quantization value of the macroblock (MQUANT), a statistical amount such as the "activity" shown in the following Equation 9 is used. The activity has a strong correlation with the real difficulty data $D_j$ similar to the flatness and the intra AC, therefore it is also possible to constitute the video data compression apparatus 2 so as to perform the compression and coding by approximating the real difficulty data $D_j$ using the activity in place of these parameters.

$$act_j = 1 + \min_{sblk} - l_{to8}(\text{var } sblk) \quad (9)$$

$$\text{var } sblk = \sum_{j=1}^{64} (P_j - \overline{P})^2$$

Where,
actj: j-th activity
sblk: sub block
var: dispersion.

Further, while the operation of the video data compression apparatus 2 was explained by taking as an example a case where the simplified two pass encoding shown in the first embodiment was carried out, needless to say the video data compression apparatus 2 can perform the predictive simplified two pass encoding as well.

Further, modifications similar to those with respect to the video data compression apparatus 1 shown in the first embodiment are also possible with respect to the video data compression apparatus 2 shown in the second embodiment.

Third Embodiment

Below, a third embodiment of the present invention will be explained.

In the FFRC system shown in the second embodiment, the real difficulty data $D_j$ was approximated by substituting the statistically found indicator data (statistical amount), that is, the ME residual, flatness, intra AC, and activity into the primary function such as Equation 5 and Equation 6.

These indicator data and the real difficulty data $D_j$ have a strong correlation as shown in FIG. 7, FIG. 8, FIG. 10, and FIG. 11, but a slight difference occurs from the above primary function according to the pattern of the video data.

The processing of the video data compression apparatus 2 in the third embodiment is designed so as to solve such a disadvantage and is enhanced so that the proportional coefficients $a_P$, $a_B$, $a_I$, $a_I'$, etc. shown in Equation 5 and Equation 6 etc. are adaptively adjusted every moment in accordance with the pattern etc. of the video data so that the real difficulty data $D_j$ can be approximated by the indicator data with a higher precision than that in the second embodiment and compressed video data having a higher quality can be produced.

Below, the processing of the video data compression apparatus 2 in the third embodiment will be briefly explained.

Whenever the encoder 18 of the video data compression apparatus 2 (FIG. 6) ends one picture's worth of compression and coding, the host computer 20 learns one picture's worth of the amount of data of the generated compressed video data and the average value of the quantization values $Q_j$ at the time of the compression and coding and the global complexity explained below can be calculated.

The global complexity is defined as shown in the following Equation 10-1 to Equation 10-3 as a value obtained by multiplying the amount of data of the compressed video data and the quantization value $Q_j$ in TM5 of the MPEG and indicates the complexity of the pattern of the image.

$$X_I = S_I \times Q_I \quad (10\text{-}1)$$

$$X_P = S_P \times Q_P \quad (10\text{-}2)$$

$$X_B = S_B \times Q_B \quad (10\text{-}3)$$

Note that, in Equation 10-1 to Equation 10-3, $S_I$, $S_B$, and $S_P$ indicate the generated amounts of data of the coded I picture, B picture, and P picture, $Q_I$, $Q_B$, and $Q_P$ indicate the average values of the quantization values $Q_j$ when producing the I picture, B picture, and P picture, and $X_I$, $X_B$, and $X_P$ indicate the global complexity of the I picture, B picture, and P picture, respectively.

The global complexities shown in Equation 10-1 to Equation 10-3 do not always coincide with the real difficulty data $D_j$, but substantially coincide with the real difficulty data $D_j$ so far as the average value of the quantization values $Q_j$ is not extremely large or small.

Here, when the indicator data of the I picture, P picture, and the B picture, for example the intra AC (other parameter is also possible) and ME residual, and the global complexity have a proportional relationship, the proportional coefficients $\epsilon^I$, $\epsilon^P$, and $\epsilon^B$ between these indicator data and global complexity can be calculated by following Equation 11-1 to Equation 11-3.

$$\text{Case of } I \text{ picture } \varepsilon_j^I = \frac{X_I}{\text{Intra\_AC}} \qquad (11\text{-}1)$$

$$\text{Case of } P \text{ picture } \varepsilon_j^P = \frac{X_P}{\text{ME\_resid}} \qquad (11\text{-}2)$$

$$\text{Case of } B \text{ picture } \varepsilon_j^B = \frac{X_B}{\text{ME\_resid}} \qquad (11\text{-}3)$$

The real difficulty data $D_j$ of each picture type is calculated as shown in following Equation 12-1 to Equation 12-3 by using the proportional coefficients $\epsilon^I$, $\epsilon^P$, and $\epsilon^B$ calculated by Equation 11-1 to Equation 11-3.

$$\text{Case of I Picture } D_j^I = \epsilon_j^I \times \text{Intra\_AC} \qquad (12\text{-}1)$$

$$\text{Case of P Picture } D_j^P = \epsilon_j^P \times ME\_resid_j \qquad (12\text{-}2)$$

$$\text{Case of B Picture } D_j^B = \epsilon_j^B \times ME\_resid \qquad (12\text{-}3)$$

The host computer 20 calculates and optimizes the proportional coefficients $\epsilon^I$, $\epsilon^P$, and $\epsilon^B$ whenever the encoder 18 compresses and codes one picture as shown in Equation 11-1 to Equation 11-3 and finds the values of the real difficulty data $D_j$ of picture types by Equation 12-1 to Equation 12-3, whereby the real difficulty data $D_j$ can be always optimally approximated by the indicator data irrespective of the pattern of the video data.

The host computer 20 performs the computation processing shown in Equation 1 with respect to the real difficulty data $D_j$ approximated as shown in Equation 11 and Equation 12 to calculate the target amount of data $T_j$.

Note that, as in TM5 of the MPEG, when the value of the target amount of data $T_j$ to be actually calculated is intentionally changed by a constant ratio with respect to the value determined based on the real difficulty data $D_j$, the target amount of data $T_j$ can be calculated by the following Equation 13-1 to Equation 13-3:

$$\text{Case of } I \text{ Picture } T_j = \qquad (13\text{-}1)$$

$$\frac{K_P \times K_B \times D_j}{K_P \times K_B \times D_I + K_B \times \sum_{P\text{-}picture} D_P + K_P \times \sum_{B\_picture} D_B} \times R_j$$

$$\text{Case of } P \text{ Picture } T_j = \qquad (13\text{-}2)$$

$$\frac{K_B \times D_j}{K_P \times K_B \times D_I + K_B \times \sum_{P\text{-}picture} D_P + K_P \times \sum_{B\_picture} D_B} \times R_j$$

$$\text{Case of } B \text{ Picture } T_j = \qquad (13\text{-}3)$$

$$\frac{K_p \times D_j}{K_P \times K_B \times D_I + K_B \times \sum_{P\text{-}picture} D_P + K_P \times \sum_{B\_picture} D_B} \times R_j$$

Note that, in all denominators of Equation 13-1 to Equation 13-3, $D_{I,P,B}$ indicates the real difficulty data $D_j$ approximated by the indicator data produced from L pictures' worth of the noncompressed video data buffered in the FIFO memory 160 before input to the encoder 18, and $R_j$ indicates the average value of the amounts of data which can be assigned to L pictures after the j-th picture.

Below, the operation of the video data compression apparatus 2 according to the third embodiment will be explained.

Figure 12:
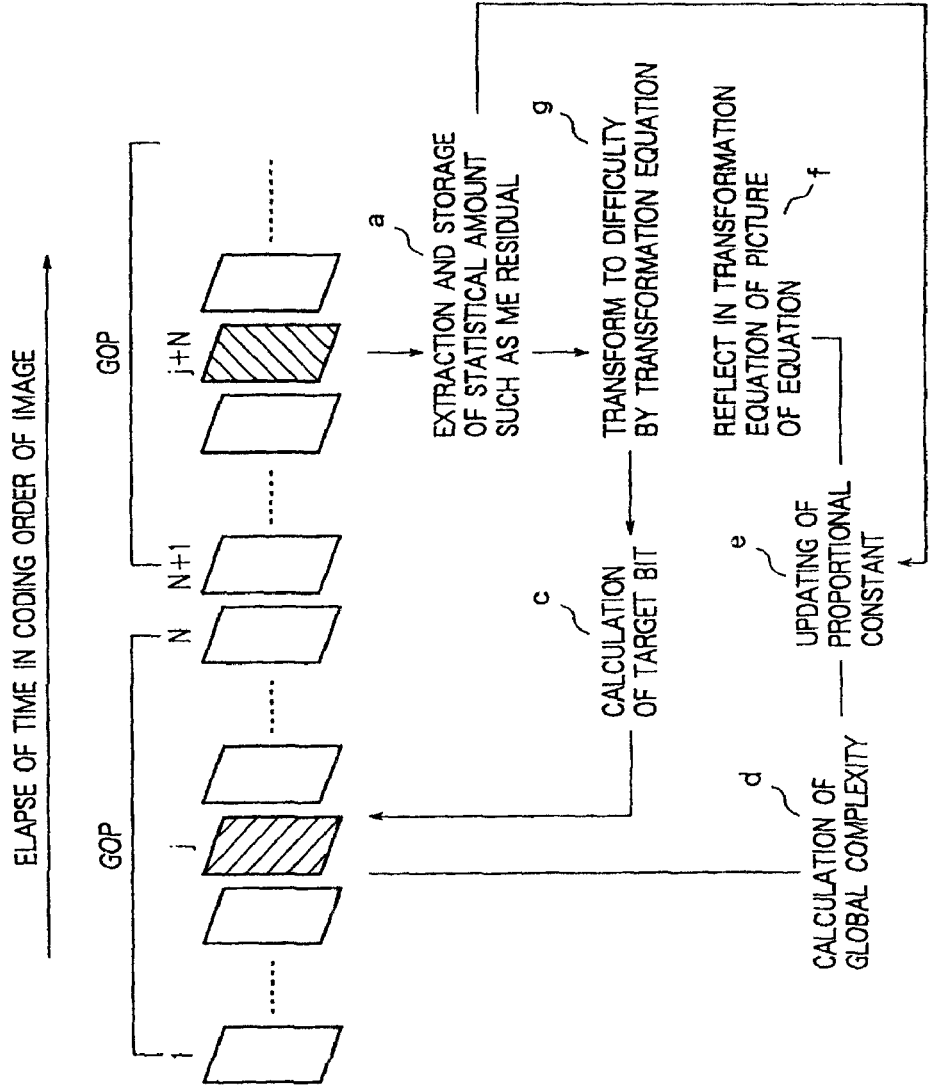
FIG. 12 is a view of a compression and coding operation of the video data compression apparatus (FIG. 6) according to a third embodiment of the present invention.

FIG. 12 is a view of the compression and coding operation of the video data compression apparatus 2 (FIG. 6) in the third embodiment.

The encoder control unit 22 rearranges the pictures of the noncompressed video data VIN in the order of coding similar to the second embodiment, performs the picture field transformation, etc. and calculates the statistical amount such as flatness and intra AC from the j+N-th picture to be compressed and coded to the I picture.

The motion detector 14 produces a motion vector for the j+N-th picture to be compressed and coded to the I picture or B picture similar to that in the first embodiment and second embodiment and further calculates the ME residual (FIG. 12A).

The FIFO memory 160 delays the input video data by exactly the amount of L pictures similar to the first embodiment and the second embodiment.

The host computer 20 performs the computation processing shown in Equation 12-1 and 12-2 with respect to the ME residual produced by the motion detector 14, approximates the real difficulty data $D_j$, performs the computation processing shown in Equation 12-3, and approximates the real difficulty data $D_j$ by the intra AC, etc. (FIG. 12B).

Further, the host computer 20 substitutes the approximated real difficulty data $D_j$ into Equation 1 or Equations 13-1 to 13-3 to calculate the target amount of data $T_j$ and sets the same in the quantization control circuit 180 of the encoder 18 (FIG. 12C).

The DCT circuit 166 of the encoder 18 performs the DCT processing for the j-th picture of the delayed video data similar to that in the first embodiment and the second embodiment.

The quantization circuit 168 quantizes the data of the frequency domain of the j-th picture input from the DCT circuit 166 by the quantization value $Q_j$-adjusted based on the target amount of data $T_j$ by the quantization control circuit 180 and, at the same time, calculates the average value of the quantization values $Q_j$ used for the compression and coding of the j-th picture and outputs the same to the host computer 20.

The variable length coding circuit 170 performs variable length coding on the quantized data of the j-th picture input from the quantization circuit 168 similar to that in the first embodiment and second embodiment to produce the compressed video data VOUT of an amount of data near the target amount of data $T_j$ and outputs the same via the buffer memory 182.

When the encoder 18 terminates the compression and coding of the j-th picture, the host computer 20 calculates the global complexity as shown in Equation 10-1 to Equation 10-3 based on the average value of the quantization values with respect to the j-th picture input from the quantization control circuit 180 and the amount of data of the compressed and coded j-th picture (FIG. 12D).

Further, the host computer 20 updates the proportional coefficients $\epsilon^I$, $\epsilon^P$, and $\epsilon^B$ as shown in Equation 11-1 to Equation 11-3 by the calculated global complexity (FIG. 12E). The updated proportional coefficients $\epsilon^I$, $\epsilon^P$, and $\epsilon^B$ are reflected in the transformation equations at the time of compression and coding of the next picture (Equation 12-1 to Equation 12-3).

Figure 13:
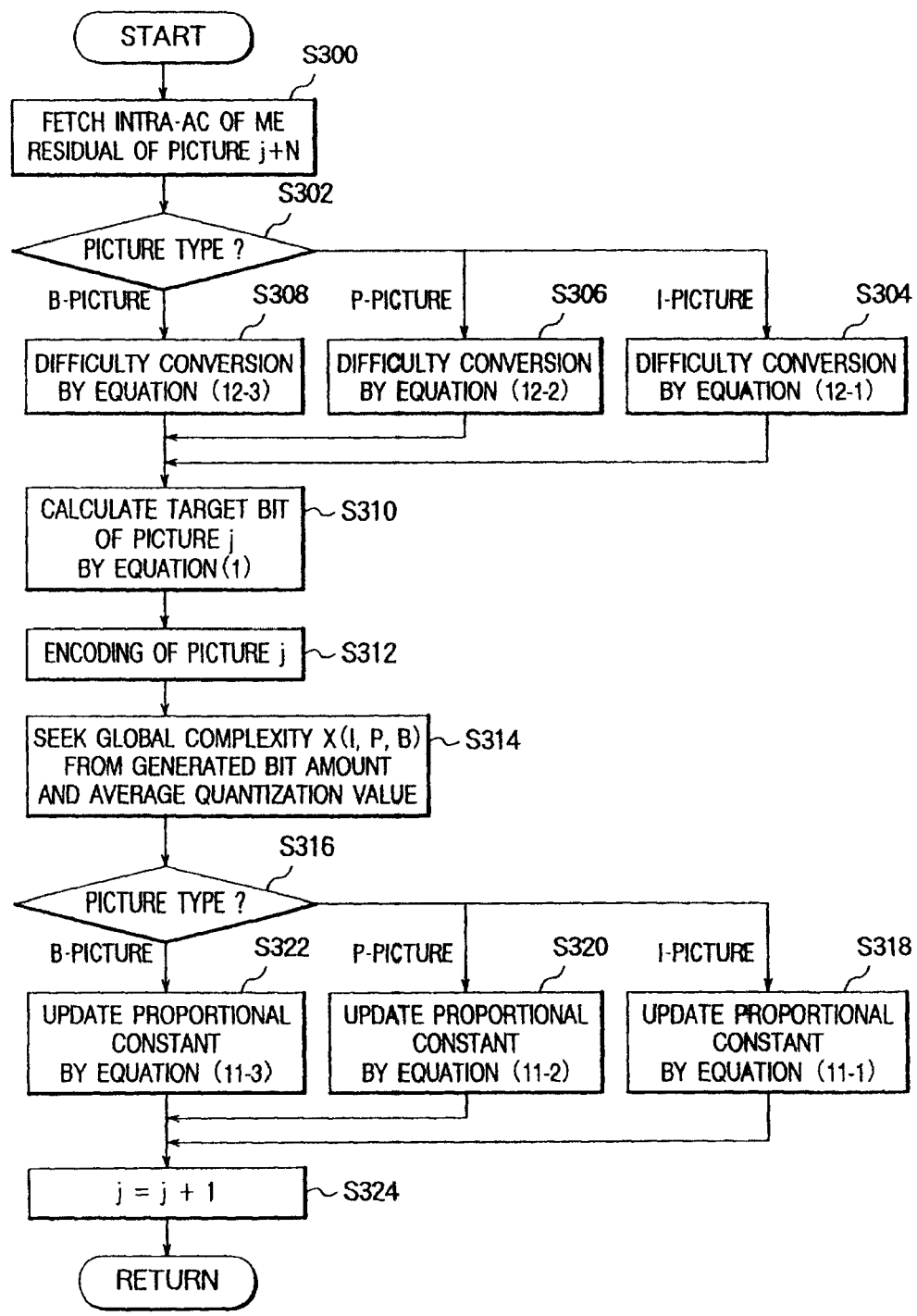
FIG. 13 is a view of the content of the processing of the host computer (FIG. 6) of the video data compression apparatus 2 according to the third embodiment of the present invention.

The content of the processing of the host computer 20 in the third embodiment will be further explained by referring to FIG. 13.

FIG. 13 is a view of the content of the processing of the host computer 20 (FIG. 6) of the video data compression apparatus 2 in the third embodiment.

As shown in FIG. 13, at step 300 (S300), the host computer 20 fetches the (j+L)-th indicator data (statistical amount) such as ME residual or intra AC from the encoder control unit 22 or the motion detector 14.

At step 302 (S302), the host computer 20 decides to which picture type the (j+1)-th picture is to be compressed and coded. When the (j+1)-th picture is to be compressed and coded to an I picture, the operation routine proceeds to the processing of S304; when it is to be compressed and coded to a P picture, the operation routine proceeds to the processing of S306; and when it is to be compressed and coded to a B picture, the operation routine proceeds to the processing of S308.

In each of step 304 (S304), step 306 (S306), and step 308 (S308), the host computer 20 approximates the real difficulty data $D_j$ by Equation 12-1 to Equation 12-3.

At step 310 (S310), the host computer 20 calculates the target amount of data $T_j$ by Equation 1 or Equation 13-1 to Equation 13-3 by using the approximated real difficulty data $D_j$.

At step 312 (S312), the encoder 18 compresses and codes the j-th picture.

At step 314 (S314), the host computer 20 calculates the global complexities $X_i$, $X_b$, and $X_p$ [X (I, B, P)] from the amount of data of the j-th picture compressed by the encoder 18 and the average value of the quantization values set in the quantization circuit 168 by the quantization control circuit 180.

At step 316 (S316), the host computer 20 decides to which picture type the (j+1)-th picture is to be compressed and coded. Where the (j+1)-th picture is to be compressed and coded to an I picture, the operation routine proceeds to the processing of S318; when it is to be compressed and coded to a P picture, the operation routine proceeds to the processing of S320; and when it is to be compressed and coded to a B picture, the operation routine proceeds to the processing of S322.

In each of step 318 (S318), step 320 (S320)m and step 322 (S322), the host computer 20 updates the proportional coefficients $\epsilon^I$, $\epsilon^P$, and $\epsilon^B$ by Equation 11-1 to Equation 11-3.

At step 324 (S324), the host computer 20 increments the numerical value j.

Note that, as mentioned in the second embodiment, there is a case where an offset ($\delta^P$) exists between the real difficulty data $D_j$ and the multiplied value of the proportional coefficients $\epsilon^I$, $\epsilon^P$, and $\epsilon^B$ and the indicator data. In such a case, by dividing the values obtained by subtracting the offset values $\delta^I$, $\delta^P$, and $\delta^B$ from the global complexities $X_i$, $X_b$, and $X_p$ by the indicator data, the proportional coefficients $\epsilon^I$, $\epsilon^P$, and $\epsilon^B$ can be calculated.

Further, modifications similar to those shown in the second embodiment are also possible for the operation of the video data compression apparatus 2 shown in the third embodiment.

As mentioned above, according to the operation of the video data compression apparatus 2 in the third embodiment, the same effect as that by the operation of the video data compression apparatus 2 shown in the second embodiment is obtained and, in addition, a further correct target amount of data $T_j$ than that in the second embodiment can be calculated, and as a result, the quality of the compressed video data can be improved.

Fourth Embodiment

Below, a fourth embodiment of the present invention will be explained.

Up to here, the explanation was made of the feed forward rate control (FFRC) system for achieving both an improvement of quality of the compressed video data and a real time property of the compression and coding processing by using the indicator data (statistical amount), that is, flatness, intra AC, activity, and ME residual, as the second embodiment and the third embodiment.

In the fourth embodiment, an explanation will be made of a video data compression method (improved FFRC method) using a video data compression apparatus 2 (FIG. 16 and FIG. 17) with which the encoder for obtaining the real difficulty data $D_j$ is unnecessary and in addition the quality of the compressed video data of the border (scene change) part of the video data (scene) contained in the edited video data is not lowered.

It can be considered to perform the compression and coding by detecting a part where the real difficulty data $D_j$ largely changes along with time as a scene change part and changing the picture type sequence. The detection of such a scene change is possible also in the FFRC method by monitoring the change of the real difficulty data $D_j$ approximated by the indicator data in place of the real difficulty data $D_j$ along with the elapse of time.

However, to determine the existence of a scene change, it is necessary to monitor the change of the indicator data within a range of about 1 GOP in time before and after the scene change part. In the video data compression apparatus 2, the detection of the scene change part becomes possible only after a considerable time has elapsed after the motion detector 14 calculates the indicator data. In actuality, there also exists a possibility that the detection of the scene change part will become possible only immediately before the compression and coding processing in the encoder 18.

Accordingly, the host computer 20 must substantially terminate the processing for approximating the real difficulty data $D_j$ by the indicator data (Equations 5 to 8 shown in the second embodiment and Equation 12-1 to Equation 12-3 shown in the third embodiment) before the detection of the scene change in order to ensure sufficient processing time.

The video data compression apparatus 2 in the fourth embodiment provisionally performs the processing for approximation of the real difficulty data $D_j$ by the indicator data or the global complexity in a state where the result of detection of the scene change is not determined, corrects only the part requiring a change along with a scene change in the provisionally calculated real difficulty data $D_j$ after the existence of a scene change and the existence of a change of the picture type sequence are determined, and thereby performs the processing for calculating the target amount of data $T_j$.

Below, the content of the compression and coding processing of the video data compression apparatus 2 in the fourth embodiment will be explained by taking as an example a case where the picture type sequence with respect to N number of pictures is finally determined whenever the calculation of the ME residuals of N [for simplification of the explanation, below, for example it is assumed that N=L (L is the number of pictures corresponding to the delay time of the FIFO memory 160)] number of pictures is carried out. Note that, the N number of pictures used for the determination of the picture type sequence are the processing units of the processing for determining the picture type sequence and do not always have to coincide with the picture type sequence in the encoder 18. Further, the header does not have to be an I picture unlike the usual GOP. Further, below, one set of such N number of pictures will be also referred to as a rate control GOP (RC-GOP).

Figure 14:
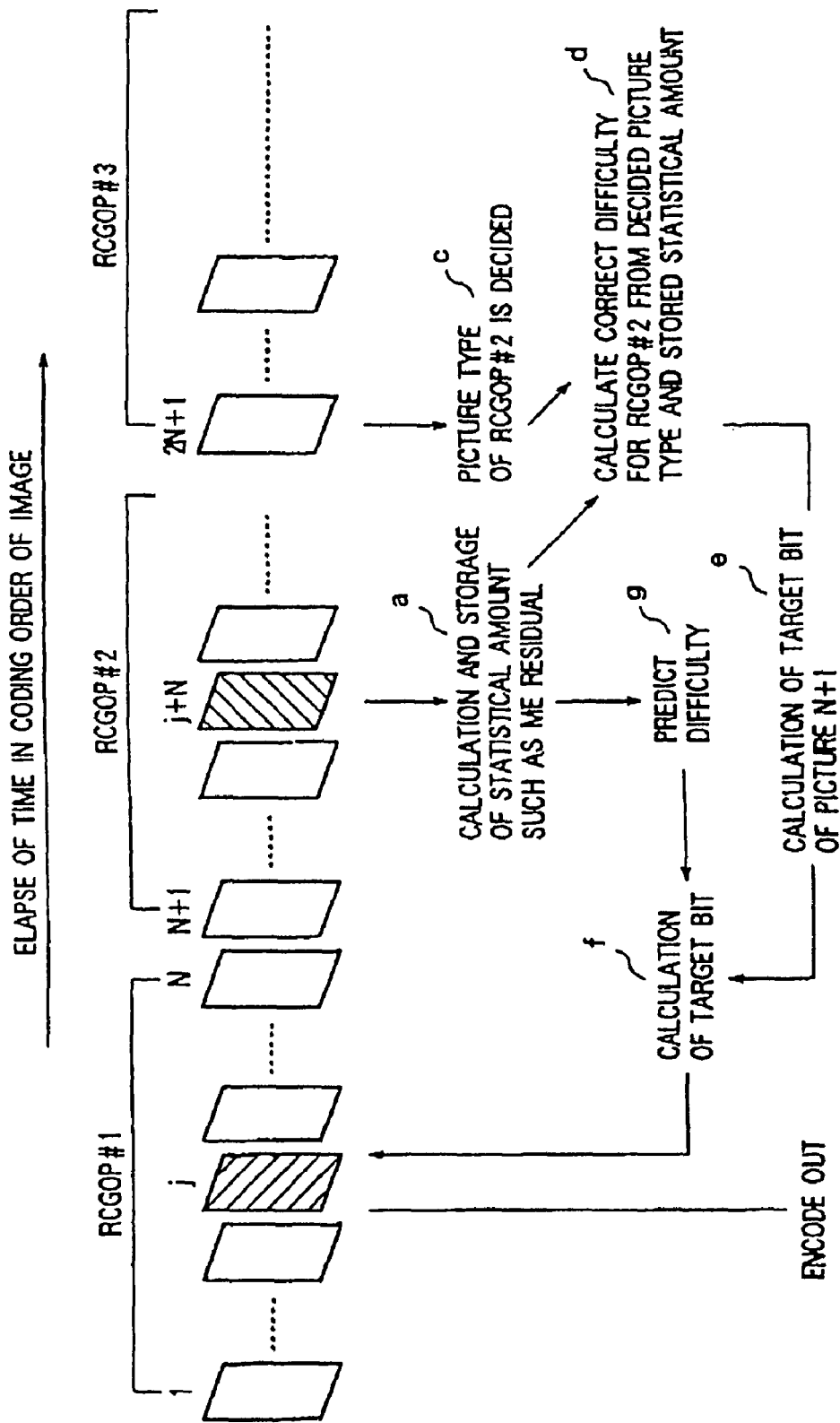
FIG. 14 is a view of the compression and coding operation of the video data compression apparatus according to a fourth embodiment of the present invention in an order of coding.

FIG. 14 is a view of the compression and coding operation of the video data compression apparatus 2 in the fourth embodiment (FIG. 5) in the order of coding.

The motion detector 14 generates a motion vector for the (j+N)-th picture to be compressed and coded to a P picture and a B picture similar to that in the first embodiment to the third embodiment and further calculates the ME residual.

The encoder control unit 22 performs the preprocessing of the rearrangement etc. of pictures similar to that in the second embodiment and the third embodiment and further calculates the indicator data such as the flatness, intra AC, and activity.

The FIFO memory 160 delays the input video data by exactly an amount of L pictures similar to that in the first embodiment to the third embodiment.

Whenever the video data compression apparatus 2 (FIG. 5) ends one picture's worth of compression and coding, the host computer 20, similar to that in the second embodiment and the third embodiment, receives as input the flatness, intra AC, and activity calculated by the encoder control unit 22 and the MR residual (statistical amount) calculated by the motion detector 14. The host computer 20 stores these indicator data (FIG. 14A). Further, assuming that no scene change occurs and no change will occur in the picture sequence, the host computer 20 approximates and predicts the real difficulty data $D_j$ in the case assuming that no scene change exists by Equation 12-1 to Equation 12-3 by using the optimized proportional coefficients $\epsilon^I$, $\epsilon^P$, and $\epsilon^B$ (Equation 11-1 to Equation 11-3 shown in the third embodiment) similar to that in the third embodiment (FIG. 14B).

Specifically, assuming that the N-th picture from the I picture of the first RCGOP is compressed and coded to an I picture, the pictures of the order of whole multiples of M (n×M) are compressed and coded to P pictures, and the pictures other than them are compressed and coded to B pictures, the host computer 20 substitutes the indicator data produced by the pictures to be respectively compressed and coded to an I picture, P picture, and B picture and the proportional coefficients $\epsilon^I$, $\epsilon^P$, and $\epsilon^B$ into Equation 12-1 to Equation 12-3 to approximate and calculate the real difficulty data $D_j$. Note, M indicates the interval of the P pictures in the encoder 18 where there is no scene change.

That is, the host computer 20 counts the number of pictures by using the I picture of the previous RCGOP (first CGOP: RCGOP$_\#$1) as a reference, assumes which picture type the encoder 18 compresses and codes each picture of the second RCGOP (RCGOP$_\#$2) to, and approximates and predicts the value of the real difficulty data $D_j$ by the indicator data in accordance with the assumed picture type as shown in Equation 12-1 to Equation 12-3.

Note that, the probability of existence of the scene change part in the RCGOP is considered to be relatively small, therefore the host computer 20 will calculate the target amount of data $T_j$ with respect to most RCGOP based on the predicted real difficulty data $D_j$ (FIG. 14F).

Further, the real difficulty data $D_j$ is only used in the calculation of denominator of Equation 1 (first embodiment) or Equation 13-1 to Equation 13-3 (third embodiment). As will be explained later, the host computer 20 performs correction at a stage where the existence of a change of the picture type sequence is determined, therefore the value of the target amount of data $T_j$ can be always correctly calculated.

When the calculation of the real difficulty data $D_j$ of each picture of the second RCGOP (RCGOP$_\#$2) is terminated, the host computer 20 can detect a scene change in the second RCGOP by using the calculated real difficulty data $D_j$ or indicator data. For example, the host computer 20 monitors the change of the value of the real difficulty data $D_j$ along with the elapse of time and determines that a scene change is generated in a P picture by the method of detecting the P picture in which the value of the real difficulty data $D_j$ indicates a value of for example 1.5 (practically, preferably a value within a range of from 1.4 to 1.8) times the real difficulty data $D_{j-1}$ of the P picture immediately before this, and so on. Where the scene change is detected, the host computer 20 further controls the encoder 18 and changes the picture type sequence when compressing and coding the parts before and after the scene change of the edited video data so as to change the first P picture of the back scene to an I picture not referring to the last picture of the previous scene and change the last I picture of the previous scene to the P picture as shown in FIGS. 15B and 15C.

By such processing of the host computer 20, the existence of a change of the picture type sequence is seen, and the picture type to which each picture is to be compressed and coded is decided (FIG. 14C).

The host computer 20 corrects the value of the real difficulty data $D_j$ for the second RCGOP based on the stored indicator data and the picture type after the change where there is a change in the picture type sequence, calculates the correct real difficulty data $D_j$ (FIG. 14D), calculates the target amount of data $T_{N+1}$ (target bit) of the (N+1)-th picture in accordance with each picture type by using Equation 1 and Equation 13-1 to Equation 13-3 (FIG. 14E), and sets the same in the quantization control circuit 180 of the encoder 18.

Figure 15:
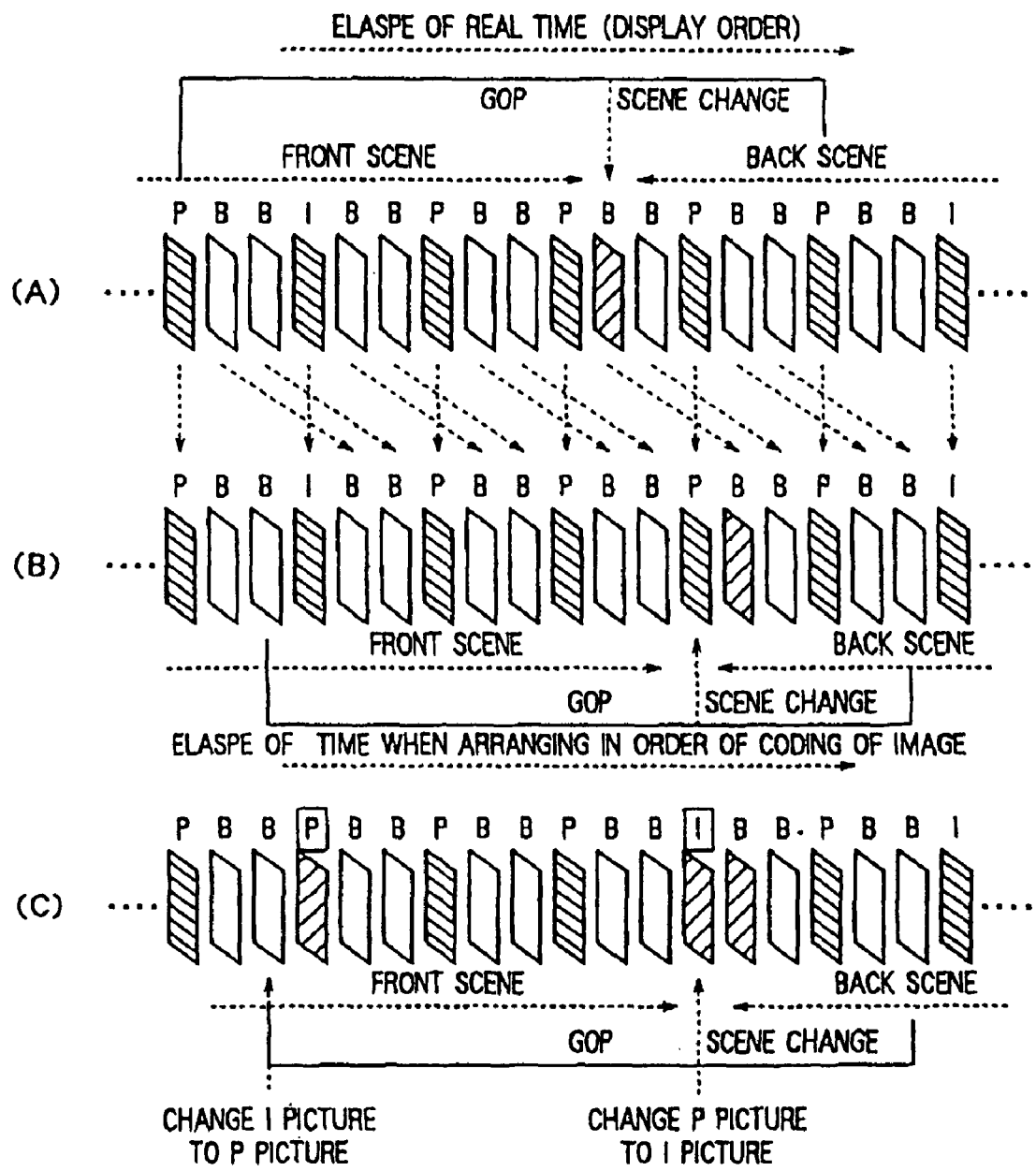
FIGS. 15A to 15C are views of a processing for rearrangement of the order of the pictures of the edited video data by an encoder control unit (FIG. 1) and processing for changing the picture type by the host computer.

Specifically, as shown in FIG. 15C, the host computer 20 substitutes the indicator data of the picture changed so as to become not the P picture, but the I picture after the compression into Equation 12-2 in place of Equation 12-1, and conversely, substitutes the indicator data of the picture changed so as to become not the I picture, but the P picture after the compression into Equation 12-1 in place of Equation 12-2, thereby to correct the value of the real difficulty data $D_j$.

The DCT circuit 166 of the encoder 18 performs DCT processing similar to that in the first embodiment to the third embodiment.

The quantization circuit 168 quantizes the DCT-processed video data by the quantization value $Q_j$ adjusted by the quantization control circuit 180 based on the target amount of data $T_j$ and calculates the average value of the quantization values $\bar{Q}_j$.

The variable length coding circuit 170 performs variable length coding similar to that in the first embodiment to the third embodiment, produces the compressed video data VOUT of an amount of data near the target amount of data $T_j$, and outputs the same via the buffer memory 182.

When the encoder 18 terminates the compression and coding of the j-th picture, the host computer 20 calculates the global complexity as shown in Equation 10-1 to Equation 10-3 based on the average value of the quantization values $\bar{Q}_j$, and the amount of data of the compressed and coded j-th picture.

Further, the host computer 20 updates and optimizes the proportional coefficients $\epsilon^I$, $\epsilon^P$, and $\epsilon^B$ as shown in Equation 11-1 to Equation 11-3 by the calculated global complexity. In the same way as in the third embodiment, the updated proportional coefficients $\epsilon^I$, $\epsilon^P$, and $\epsilon^B$ are reflected in the transformation equations at the time of compression and coding of the next picture (Equation 12-1 to Equation 12-3).

Figure 16:
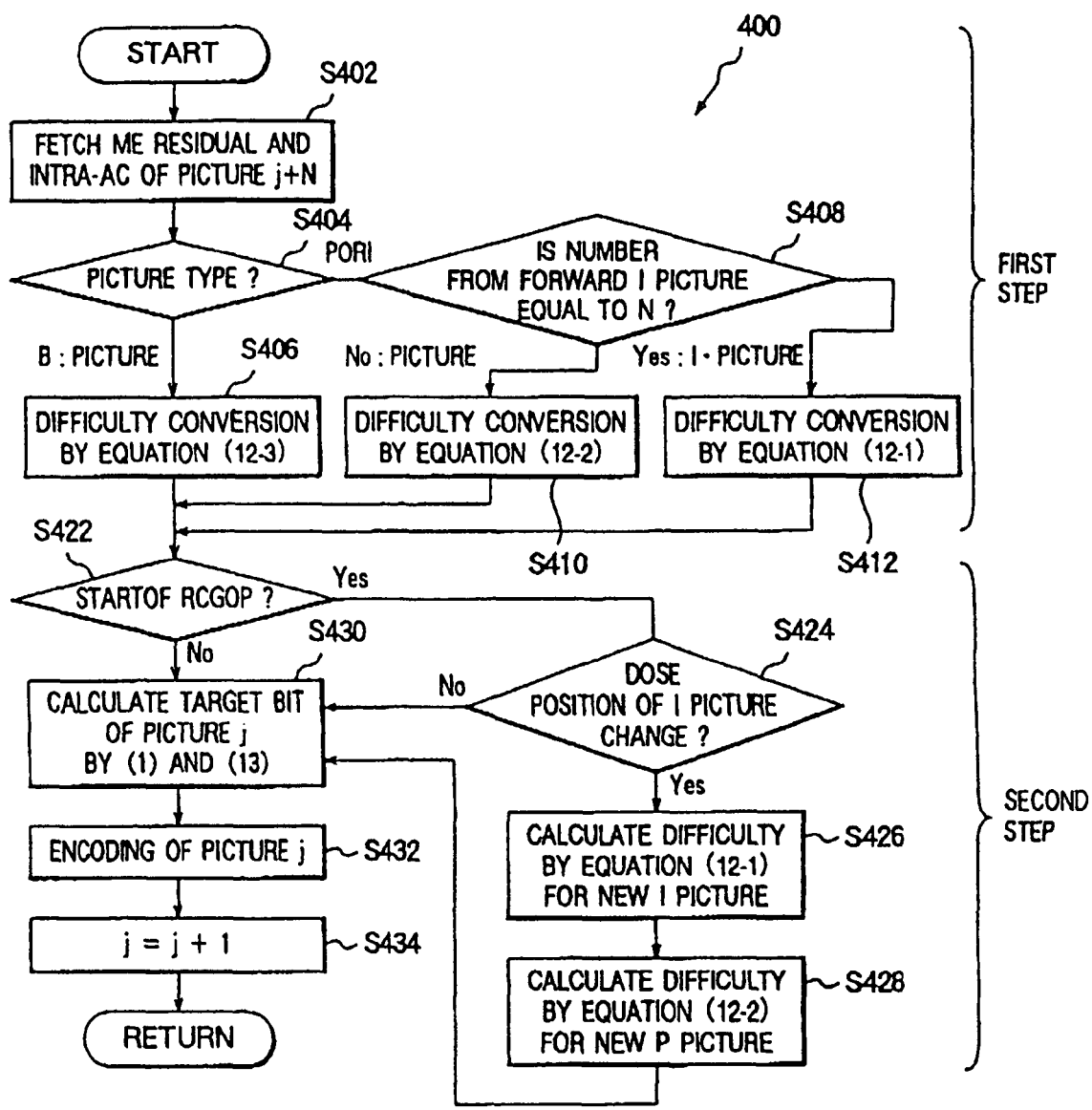
FIG. 16 is a flowchart of the content of the processing of the host computer of the video data compression apparatus according to a fourth embodiment of the present invention.

The content of the processing of the host computer 20 in the fourth embodiment will be further explained referring to FIG. 16.

FIG. 16 is a flowchart of the content of the processing of the host computer 20 in the video data compression apparatus 2 in the fourth embodiment.

As shown in FIG. 16, the processing of the host computer 20 in the fourth embodiment is divided into a first stage (S400) and a second stage (S420). At the first stage, processing for predicting the real difficulty data $D_j$ is carried out by assuming that there is no scene change and there is no change in the picture type sequence, and at the second stage, processing for correcting the value of the real difficulty data $D_j$ is carried out where a scene change occurs and the picture type sequence is changed.

The first stage (S400; S402 to S412) is the processing for predicting the real difficulty data where there is no scene change. At step 402 (S402) of the first stage, the host computer 20 fetches the indicator data (statistical amount) such as the ME residual or intra AC of the (j+L)-th picture from the encoder control unit 22 or the motion detector 14 and stores the same.

At step 404 (S404), the host computer 20 decides whether or not the [j+L (J+N)]-th picture is to be compressed and coded to a B picture. Where the (j+L)-th picture is to be compressed and coded to a B picture, the operation routine proceeds to the processing of S406, while where it is not to be compressed and coded to a B picture, the operation routine proceeds to the processing of S408.

At step 406 (S406), the host computer 20 predicts that the (j+L)-th picture is to be compressed and coded to a B picture and approximates and calculates the real difficulty data $D_j$ by Equation 12-3.

At step 408 (S408), the host computer 20 decides whether or not the number (interval) from the picture to be compressed and coded to the I picture in the previous RCGOP to the (J+L)-th picture of the current RCGOP is N. Where the interval is N, the operation routine proceeds to the processing of S412, while where it is not N, the operation routine proceeds to the processing of S410.

At step 410 (S410), the host computer 20 predicts that the (J+L)-th picture is to be compressed and coded to a P picture and approximates and calculates the real difficulty data $D_j$ by Equation 12-2.

At step 412 (S412), the host computer 20 predicts that the (J+L)-th picture is to be compressed and coded to an I picture and approximates and calculates the real difficulty data $D_j$ by Equation 12-1.

The second stage (S420; S422 to S434) is the processing for correcting the real difficulty data $D_j$ predicted at the first stage. At step 422 (S422) of the second stage, the host computer 20 decides whether or not a new RCGOP starts. Where it does not start, the operation routine proceeds to the processing of S430, while where it starts, the operation routine proceed to the processing of S424.

At step 424 (S424), the host computer 20 decides whether or not the picture type sequence is changed so that the position of the I picture changes. Where the picture type sequence is changed so that the position of the I picture changes, the operation routine proceeds to the processing of S426, while where it is not changed, the operation routine proceeds to the processing of S430.

At step 426 (S426), the host computer 20 approximates and calculates the real difficulty data $D_j$ by Equation 12-1 for the picture newly compressed and coded to the I picture.

At step 428 (S428), the host computer 20 approximates and calculates the real difficulty data $D_j$ by Equation 12-2 for the picture newly compressed and coded to the P picture.

At step 430 (S430), the host computer 20 calculates the target amount of data $T_j$ with respect to the j-th picture by Equation 1 or Equation 13-1 to Equation 13-3 and sets the same in the quantization control circuit 180 of the encoder 18 (FIG. 5).

At step 432 (S432), the encoder 18 compresses and codes the j-th picture based on the target amount of data $T_j$ set in the quantization control circuit 180.

At step 434 (S434), the host computer 20 increments the numerical value j.

Note that, in the fourth embodiment, the host computer 20 of the video data compression apparatus 2 performs the processing for correcting only the real difficulty data $D_j$ of pictures changed after compression where there is a scene change, but when there is a room in the processing time, it can be modified so that the real difficulty data $D_j$ of all pictures are calculated after the picture type sequence is decided.

Further, modifications similar to those in the first embodiment to the third embodiment are also possible for the operation of the video data compression apparatus 2 shown in the fourth embodiment.

Further, the contents of the processing of the video data compression apparatuses 1 and 2 respectively explained in the first embodiment to the third embodiment can be combined so far as they do not contradict each other.

As mentioned above, according to the operation of the video data compression apparatus 2 in the fourth embodiment, the same effect as that by the operation of the video data compression apparatus 2 shown in the second embodiment and the third embodiment is obtained, a further correct target amount of data $T_j$ than that in those embodiments can be calculated, and in addition the quality of the compressed video data of the scene change part is not lowered.

As explained above, by the video data compression apparatus according to the present invention and the method of the same, audio and/or video data can be compressed and coded to a predetermined amount of data or less by a method other than the two pass encoding.

Further, by the video data compression apparatus according to the present invention and the method of the same, the video data can be compressed and coded in almost real time and in addition a high quality image can be obtained after expansion and decoding.

Further, by the video data compression apparatus according to the present invention and the method of the same, the compression rate is adjusted by estimating the amount of data after the compression and coding and the compression and coding processing can be carried out by a method other than two pass encoding.

What is claimed is:

1. A video data compression apparatus, comprising:
   delay means for delaying predetermined number of images;
   indicator data calculating means for calculating indicator data having a correlation with a difficulty of a pattern of an image and an amount of data after compression from non-compressed video data;
   target value calculating means for calculating a target value of the amount of data after compression of video data based on said calculated indicator data; and
   compressing means for compressing non-compressed video data so that the amount of data after compression becomes the calculated target value,
   wherein the target value calculating means calculates the target value based on a ratio of said calculated indicator data to the summation value of all indicator data of the predetermined number of images.

2. A video data compression apparatus, comprising:
   delay means for delaying a predetermined number of images;
   indicator data calculating means for calculating a statistical amount and indicator data both having a correlation with a difficulty of a pattern of an image and an amount of data after compression from non-compressed video data;

target value calculating means for calculating a target value of the amount of data after compression of video data based on said calculated indicator data; and compressing means for compressing non-compressed video data so that the amount of data after compression becomes the calculated target value, wherein the target value calculating means calculates the target value based on a ratio of said calculated indicator data to the summation value of all indicator data of the predetermined number of images.

3. A video data compression apparatus, comprising:

delay means for delaying a predetermined number of images;

indicator data calculating means for calculating indicator data having a correlation with a difficulty of a pattern of an image and an amount of data after compression from non-compressed video data;

target value calculating means for calculating a target value of the amount of data after compression of video data based on said calculated indicator data; and compressing means for compressing non-compressed video data so that the amount of data after compression becomes the calculated target value by performing feed forward control to compress, wherein the target value calculating means calculates the target value based on a ratio of said calculated indicator data to the summation value of all indicator data of the predetermined number of images.

4. A video data compression apparatus, comprising:

delay means for delaying a predetermined number of images;

indicator data calculating means for calculating a statistical amount and indicator data both having a correlation with a difficulty of a pattern of an image and an amount of data after compression from non-compressed video data;

target value calculating means for calculating a target value of the amount of data after compression of video data based on said calculated indicator data; and compressing means for compressing non-compressed video data so that the amount of data after compression becomes the calculated target value by performing feed forward control to compress, wherein the target value calculating means calculates the target value based on a ratio of said calculated indicator data to the summation value of all indicator data of the predetermined number of images.

5. The video data compression apparatus according to claim 4, wherein:

said indicator data calculating means calculates an ME residual data for said indicator data of pictures to be compressed to one of a P picture and a B picture and calculates at least one of a flatness and an intra AC data for said indicator data of a picture to be compressed to an I picture; and said target value calculating means calculates difficulty data corresponding to the amount of data after compression based on said calculated indicator data and further calculates said target value based on the calculated difficulty data.

6. The video data compression apparatus according to claim 4, wherein said indicator data calculating means calculates an activity for the indicator data for compressing said video data to an I picture.

7. The video data compression apparatus according to claim 4, further comprising delaying means for delaying said video data for a predetermined time and outputting the same, wherein said target value calculating means calculates said target value with respect to a picture output by said delaying means based on said indicator data calculated during a period where said delaying means delays said video data, and wherein said compressing means compresses pictures output by said delaying means so that the amount of data after compression becomes said calculated target value.

8. The video data compression apparatus according to claim 4, wherein:

said indicator data calculating means calculates the indicator data having the correlation with the difficulty of the pattern of the image and the amount of data after compression for every picture from the non-compressed video data; and said target value calculating means calculates the target value of the amount of data after compression of said video data for every picture based on said calculated indicator data.

9. The video data compression apparatus according to claim 4, wherein:

said indicator data calculating means calculates the indicator data having the correlation with the difficulty of the pattern of the image and the amount of data after compression for every GOP from the non-compressed video data; and said target value calculating means calculates the target value of the amount of data after compression of said video data for every GOP based on said calculated indicator data.

10. A video data compression method, comprising the steps of:

delaying a predetermined number of images;

calculating a statistical amount and indicator data both having a correlation with a difficulty of a pattern of an image and an amount of data after compression from non-compressed video data;

calculating a target value of the amount of data after compression of video data based on said calculated indicator data; and compressing non-compressed video data so that the amount of data after compression becomes the calculated target value by performing feed forward control to compress, wherein the target value calculating step calculates the target value based on a ratio of said calculated indicator data to the summation value of all indicator data of the predetermined number of images.

11. A video data compression apparatus, comprising:

a delay unit for delaying a predetermined number of images;

indicator data calculator for calculating a statistical amount and indicator data both having a correlation with a difficulty of a pattern of an image and an amount of data after compression from non-compressed video data;

target value calculator for calculating a target value of the amount of data after compression of video data based on said calculated indicator data; and compressor for compressing non-compressed video data so that the amount of data after compression becomes the calculated target value by performing feed forward control to compress, wherein the target value calculator calculates the target value based on a ratio of said calculated indicator data to the summation value of all indicator data of the predetermined number of images.

* * * * *

UNITED STATES PATENT AND TRADEMARK OFFICE
CERTIFICATE OF CORRECTION

| | | |
|---|---|---|
| PATENT NO. | : 7,881,373 B2 | Page 1 of 1 |
| APPLICATION NO. | : 11/223162 | |
| DATED | : February 1, 2011 | |
| INVENTOR(S) | : Kanji Mihara et al. | |

It is certified that error appears in the above-identified patent and that said Letters Patent is hereby corrected as shown below:

Title page Add

Item

--(63) Related U.S. Application Data

Continuation of application No. 10/045,576, filed on Mar. 20, 2001, now Pat. No. 7,050,495, which is a continuation of application No. 08/909,448, filed on Aug. 11, 1997, now Pat. No. 6,337,879.

(30) Foreign Application Priority Data

August 14, 1996   JP   08-214707
August 30, 1996   JP   08-229651--.

Signed and Sealed this

Seventh Day of February, 2012

David J. Kappos
*Director of the United States Patent and Trademark Office*